United States Patent
Yoshioka

(10) Patent No.: US 9,253,530 B2
(45) Date of Patent: Feb. 2, 2016

(54) STREAM DATA MANAGEMENT PROGRAM, METHOD AND SYSTEM

(75) Inventor: Takashi Yoshioka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 950 days.

(21) Appl. No.: 12/858,721

(22) Filed: Aug. 18, 2010

(65) Prior Publication Data
US 2010/0312908 A1 Dec. 9, 2010

Related U.S. Application Data

(63) Continuation of application No. PCT/JP2008/056363, filed on Mar. 31, 2008.

(30) Foreign Application Priority Data

Feb. 19, 2008 (JP) ................................ 2008-037445

(51) Int. Cl.
*G06F 15/16* (2006.01)
*G06Q 40/00* (2012.01)
(Continued)

(52) U.S. Cl.
CPC .............. *H04N 21/435* (2013.01); *H04L 9/321* (2013.01); *H04L 9/3247* (2013.01);
(Continued)

(58) Field of Classification Search
CPC ............... H04L 2209/60; H04L 9/321; H04N 21/23476; H04N 21/435; Y10S 707/99942
USPC ............................ 370/252; 713/170; 709/231
See application file for complete search history.

(56) References Cited

U.S. PATENT DOCUMENTS 6,009,176 A * 12/1999 Gennaro et al. ............... 713/170
6,064,748 A * 5/2000 Hogan .......................... 382/100
(Continued)

FOREIGN PATENT DOCUMENTS

EP       1 498 799 A2     1/2005
EP       1744277 A2 *     1/2007
(Continued)

OTHER PUBLICATIONS

Yoshioka, T. et al., *Proposal on Partial Integrity Assurance Technology that Considers Correction and Distribution for Electronic Documents*, FIT2004 (4 pp.).
(Continued)

*Primary Examiner* — Arvin Eskandarnia
*Assistant Examiner* — Margishi Desai
(74) *Attorney, Agent, or Firm* — Staas & Halsey LLP

(57) ABSTRACT

A stream data management method includes: storing in a sequence header of the top original moving image information a terminal ID indicating a terminal which generated original moving image information and date-and-time information which is guaranteed by a third party, storing in a sequence header of the next original moving image information a characteristic value of the last partial information of the preceding original moving image information, generating signature-related information of the original moving image information, generating cutout moving image information to which a sequence header is added, generating signature-related information of the cutout moving image information, and verifying originality and actual time of cutout stream data based on the cutout moving image information, the signature-related information of the cutout moving image information, and the signature-related information of the original moving image information.

20 Claims, 37 Drawing Sheets

(51) Int. Cl.
H04N 21/435 (2011.01)
H04N 21/235 (2011.01)
H04N 21/845 (2011.01)
H04L 9/32 (2006.01)
H04L 12/801 (2013.01)
H04L 29/06 (2006.01)

(52) U.S. Cl.
CPC ........ *H04N 21/235* (2013.01); *H04N 21/8456* (2013.01); *H04L 47/34* (2013.01); *H04L 69/16* (2013.01); *H04L 2209/60* (2013.01)

(56) References Cited

U.S. PATENT DOCUMENTS

| | | | |
|---|---|---|---|
| 7,027,516 B2 * | 4/2006 | Anderson et al. | 375/240.26 |
| 7,231,156 B1 * | 6/2007 | Sparrell et al. | 713/156 |
| 7,353,541 B1 * | 4/2008 | Ishibashi et al. | 726/26 |
| 2001/0048680 A1 * | 12/2001 | Yoshimura et al. | 370/389 |
| 2002/0028061 A1 * | 3/2002 | Takeuchi et al. | 386/68 |
| 2002/0041628 A1 * | 4/2002 | Andersson et al. | 375/240.12 |
| 2002/0138736 A1 * | 9/2002 | Morin | 713/180 |
| 2002/0178360 A1 * | 11/2002 | Wenocur et al. | 713/170 |
| 2004/0066797 A1 * | 4/2004 | Shima | 370/465 |
| 2004/0199570 A1 * | 10/2004 | Terao | G06F 17/30312 709/201 |
| 2005/0015600 A1 * | 1/2005 | Miyazaki et al. | 713/176 |
| 2007/0033419 A1 * | 2/2007 | Kocher et al. | 713/193 |
| 2007/0050713 A1 | 3/2007 | Yoshioka et al. | |
| 2007/0192609 A1 | 8/2007 | Yoshioka et al. | |
| 2007/0223635 A1 * | 9/2007 | Kimoto | 375/368 |
| 2008/0008155 A1 * | 1/2008 | Yoon et al. | 370/349 |
| 2008/0049574 A1 * | 2/2008 | Yahata | 369/47.13 |
| 2008/0137848 A1 * | 6/2008 | Kocher et al. | 380/201 |
| 2008/0186872 A1 * | 8/2008 | Zaencker | 370/252 |
| 2008/0256362 A1 | 10/2008 | Takenaka et al. | |
| 2009/0164793 A1 | 6/2009 | Yoshioka et al. | |
| 2009/0193259 A1 | 7/2009 | Miyazaki et al. | |

FOREIGN PATENT DOCUMENTS

| | | | |
|---|---|---|---|
| EP | 2247023 A1 * | 11/2010 | H04N 7/24 |
| JP | 10-187836 | 7/1998 | |
| JP | 2007-29720 | 2/2007 | |
| JP | 2007-199764 | 8/2007 | |
| JP | 2008-178048 | 7/2008 | |
| JP | 2009-152713 | 7/2009 | |
| WO | 2006/008847 | 1/2006 | |

OTHER PUBLICATIONS

Yoshioka, T. et al., *Partial Integrity Assurance Technology PIAT: Applying to Audio and Video Data* (8 pp.).
Yoshioka, T. et al., *An Implementation of Partial Integrity Assurance Technology: PIAT for Audio and Video Data* (8 pp.).
Form PCT/ISA/210, mailed Jul. 1, 2008, in corresponding International Application PCT/JP2008/056363 (5 pp.).
Form PCT/ISA/220, mailed Jul. 1, 2008, in corresponding International Application PCT/JP2008/056363 (4 pp.).
Form PCT/ISA/237, mailed Jul. 1, 2008, in corresponding International Application PCT/JP2008/056363 (5 pp.).
Takashi Yoshioka, Masahiko Takenaka, "Proposal on Partial Integrity Assurance Technique that Considers Correction and Distribution for Electronic Documents", FIT 2004, The 3rd Information science technique forum, The collection of general lectures, Japan, The institute of electronics, information and communication engineer, corporation juridical person, Aug. 20, 2004, 4th publish, 231-232 pages.
Takashi Yoshioka, Masahiko Takenaka, Takato Ohashi, Kiyohide Yamashita, "An Implementation of Partial Integrity Assurance Technology : (PIAT) for Audio and Video Data", Encryption and information 2008 security symposium, Japan, The institute of electronics, information and communication engineer, corporation juridical person, Jan. 22, 2008, 1D1 contents protection (1), 1D1-1, 1-6 pages.
Japanese Office Action mailed Oct. 23, 2012 in Japanese Patent Application 2009-554184.
English Translation of the International Preliminary Report on Patentability issued on Oct. 5, 2010 in corresponding International Patent Application PCT/JP2008/056363.
"Information Technology-Coding of Moving Pictures and Associated Audio for Digital Storage Media at up to About 1,5 MBIT/S Part 2: Video", ISO/IEC 11172-2:1993/Cor.1:1996 (E). Jan. 1, 1993.
Chessa et al., "Mobile Applicaton Security for Video Streaming Authentication and Data Integrity Combining Digital Signature and Watermarking Techniques" IEEEVTS Vehicular Technology Conference. Proceedings, Technology Conference. Proceedings, IEEE, US, Apr. 1, 2007 pp. 634-638.
Yoshioka et al., "An Implementation of Partial Integrity Assurance Techonology: PIAT for Audio and Video Data (II)", IPSJ SIG Technical Reports, Jul. 24, 2008, pp. 37-44.
Extended European Search Report dated Sep. 24, 2013 in European Patent Application No. 08739476.3-1860.
Yasutaka Shinzaki et al., "The Proposal and Evaluation of Stream Authentication using Merkle Hash Tree and IDA," Report of Technology research of the Institute of Electronics, Information and Communication Engineers, Japan, The Institute of Electronics, Information and Communication Engineers, Jul. 14, 2006, vol. 106, No. 176, pp. 137-144.
Japanese Notice of Rejection dated Apr. 9, 2013 in Japanese Application No. 2009-554184.
European Office Action dated Jul. 3, 2015 in corresponding European Patent Application No. 08739476.3.
Yoshioka et al., "An Implementation of Partial Integrity Assurance Techonology: PIAT for Audio and Video Data", IPSJ SIG Technical Reports, Jul. 24, 2008, pp. 1-20.

* cited by examiner

GOP (NUMBER OF PICTURES 6)

FIG. 37

| GOP NUMBER | TOTAL SUM OF PICTURES RIGHT UP TO PRECEDING ONE IN GOP POSITION |
|---|---|
| 1 | 0 |
| 2 | 21,578 |
| 3 | 43,156 |
| 4 | 62,936 |
| ⋮ | ⋮ |
| 7 | 107,892 |
| 8 | 152,848 |
| ⋮ | ⋮ |

STREAM DATA MANAGEMENT PROGRAM, METHOD AND SYSTEM

CROSS-REFERENCE TO RELATED APPLICATIONS

This application is a continuation application, filed under 35 U.S.C. §111(a), of PCT Application No. PCT/JP2008/056363, filed Mar. 31, 2008, and claims priority to Japanese Application No. 2008-037445, filed Feb. 19, 2008, the disclosures of which are herein incorporated in their entirety by reference.

FIELD

The present invention relates to a stream data management program, method and system and particularly to a program, method and system that can identify an extracted portion from original stream data working together with date-and-time information guaranteed by a third party for streaming data such as moving image or audio where partial extraction (which specifically includes changes, extraction, sanitization and the like) takes place as well as capable of guaranteeing the validity of extracted data and allowing a third party to verify.

BACKGROUND

In recent years, the installation of surveillance cameras in stores, shopping districts, apartment complexes or the like and of drive recorders in commercial vehicles has become common. The number of cases where moving images are used as evidence is increasing. To deal with troubles when dealing or customer support is carried out over the phone, it has become almost a common practice to record conversations between customers and operators and store them as evidence.

These days, video tapes and image and audio files are offered without change when moving images and audio are used as evidence. However, as more images and audios are stored in digital format, it becomes easier to alter and edit the images and audios. Therefore, verification by third parties, such as signature or time stamp, is required when the images and audios are used as evidence. Services or products to tape or record the voices of telephone operators along with time stamps are actually on sale. Demand for such techniques is expected to grow over the years ahead.

Meanwhile, as the number of surveillance cameras or the like increases, there are problems with privacy protection for the use of taken images. Debates are going on in the Ministry of Internal Affairs and Communications and the like.

Due to the enforcement of the Personal Information Protection Law and the like, there are stringent restrictions on the use of individual's privacy information. Disclosure, partial deletion or the like is required at the request of the identical person.

For such problems as meeting the requirements of both evidence and privacy protection, what goes on is the research on a technique for sanitizable signatures to ensure the partial originality (integrity) of a portion of a digital document and to conceal (sanitization).

In particular, what is disclosed in International Publication Pamphlet No. WO2006/08847 is a sanitizable signature technique for digital documents to solve the problem that a signature put on a document may not be examined because the document is partially concealed (the present technique is referred to as PIAT, hereinafter). The application of the above PIAT enables the signature to be examined even for the sanitized digital document to which the signature is added and also allows a third party to verify that any portions other than the sanitized portion (where modification and addition are possible) is not altered.

However, the problem with International Publication Pamphlet No. WO2006/08847 is that when a portion of large-size data (long video and audio) such as moving image or audio is extracted, the amount of information related to the signature is large.

SUMMARY

According to an aspect of the invention, there is provided a stream data management method including: generating an original stream data item including a plurality of original data items that each include a plurality of pieces of partial information and are divided by a predetermined time unit by using a stream data generation terminal, storing in a sequence header of any one of the original data items a terminal ID indicating the stream data generation terminal and date-and-time information that is guaranteed by a third party at a time when the original stream data item is generated, and storing in a sequence header of the next original data item a characteristic value of the last piece of partial information of the preceding original data item; generating signature-related information of the original data item by adding the contents of the sequence header including the terminal ID and the date-and-time information for the original data item having the sequence header in which the terminal ID and the date-and-time information are stored, while generating signature-related information of the original data item by adding the contents of the sequence header including the characteristic value of the last piece of partial information of the preceding original data item for the other original data items; cutting out a portion of the original stream data item, producing a cutout data item by adding a sequence header including the terminal ID, the date-and-time information and the characteristic value of the last piece of partial information of the preceding original data item to each of the original data items including the cutout portion, and generating a cutout stream data item consisting of the cutout data items; generating the signature-related information of the cutout data item that includes the terminal ID and the date-and-time information when the cutout data item is in the original data item having the sequence header in which the terminal ID and the date-and-time information are stored, while generating the signature-related information of the cutout data item that includes the characteristic value of the last piece of partial information of the preceding original data item in other cases; and verifying the originality and actual time of the cutout stream data item on the basis of the cutout stream data item, the signature-related information of each cutout data item in the cutout stream data item and the signature-related information of each original data item in the original stream data item.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 37 is a diagram illustrating a list of the total sum of pictures that exist right up to the preceding one in GOP position according to an embodiment of the present invention.

DESCRIPTION OF EMBODIMENTS

Figure 1:
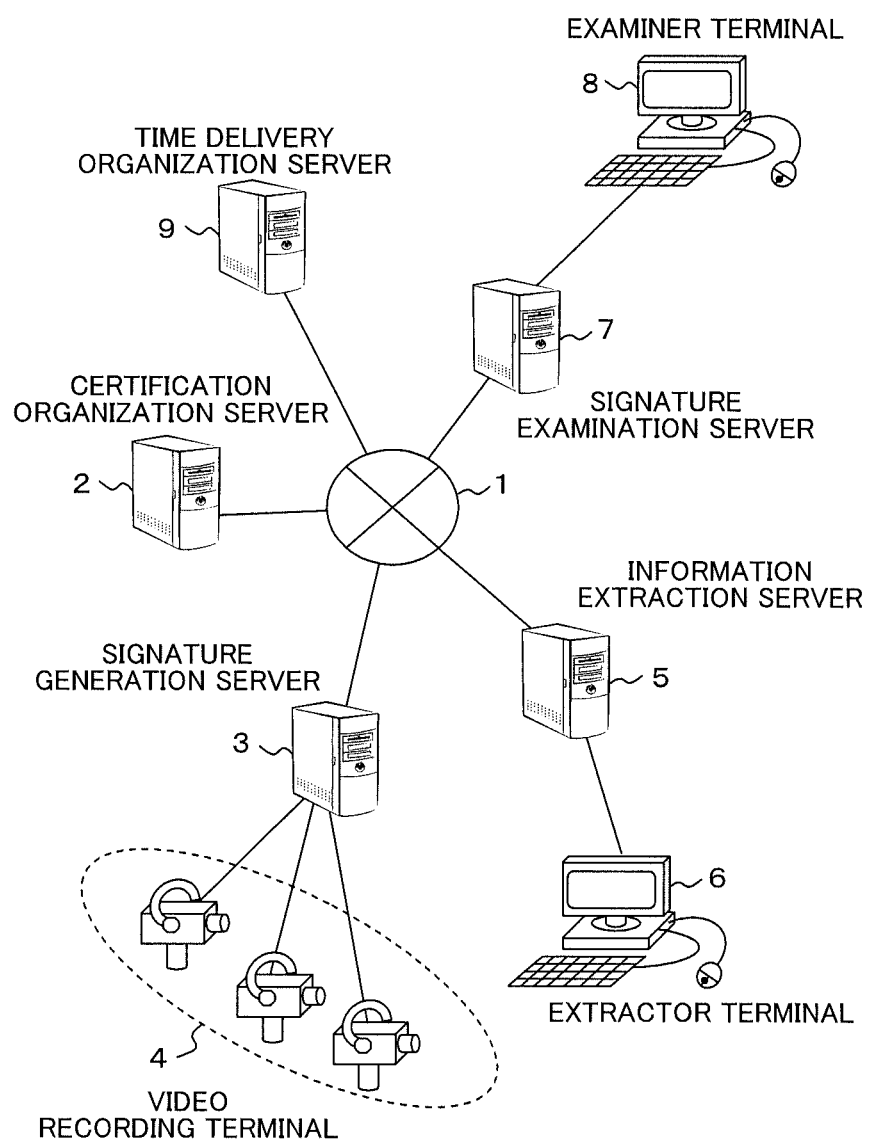
FIG. 1 is a configuration diagram of a stream data management system according to an embodiment of the present invention.

The inventor of the invention and others developed a first technique aimed at guaranteeing the originality of moving image or audio data, extracting from a signature target data whose privacy may be protected, and reducing a significant amount of signature-related data.

Moreover, the inventor of the invention and others developed a second technique which, even if a portion of original stream data is cut out, allows a third party to verify no alterations have been made with the use of a portion of the original stream data while preventing the cutout portion of the stream data from being incapable of playing.

According to the first technique which has solved the problem, the format of moving image/audio data is not noticed. Therefore, even if a portion of original stream data is cut out, it is difficult to allow a third party to verify that no alterations have been made with the use of a portion of the original stream data while preventing the cutout portion of the stream data from being incapable of playing.

According to the second technique which has solved the problem, a means is provided to add the contents of the most recent sequence header to the head of partial information (GOP) to which a sequence header (a header in which sequence information of the entire streaming data is stored) is not added at a time when the signature for the original stream data is generated, when the cutout portion of the stream data is stored, when the signature for the cutout portion of the stream data is generated, or when the signature of the stream data is examined and to generate or examine PIAT signature information with the sequence header being included. However, even though it is possible to identify the total time of the recorded streaming data and the range of the cutout time, it is impossible to identify the actual date and time indicating when the streaming data is recorded.

One conceivable way to address the problem is to acquire date-and-time information guaranteed by a third party from a time delivery organization or the like at a time when the recording ends and store the date-and-time information along with the signature. However, if the recording continues for a long time, the amount of information of streaming data becomes large. Accordingly, the information is preferable to be stored on a given unit basis (on a one hour basis, for example). As a result, at a time when the recording of the entire original stream data ends, it is necessary to acquire the date-and-time information guaranteed by a third party from a time delivery organization or the like. Therefore, costs increase. Moreover, since there is a given constant extra period of time (one hour, for example) before the next original stream data is stored, there is a possibility that wrongdoing such as alterations or extraction may be carried out by an insider or third party in the meantime.

Hereinafter, preferred embodiments of the present invention will be described with reference to the accompanying drawings.

First, the configuration of a stream data management system of the present embodiment will be described with reference to FIG. 1. In FIG. 1, the reference numeral 1 denotes a network. However, the reference numeral 1 includes all telecommunication networks such as the Internet, intranets and wide-area networks. The reference numeral 2 denotes a server of a certification organization which manages electronic signature information. As publicly known, an electronic signature is about transmitting to an opposite party signature information obtained by encrypting summary information (which is message-digested) of signature target information with a secret key of a sender, the signature target information, and a public key certificate; the receiver decrypts, after confirming the validity of the public key certificate, the encrypted signature information with a public key included in the public key certificate and compares the signature information with the summary information obtained from the signature target information. The technique is to make a determination as to whether transmission is performed by a valid opposite party depending on whether the result of comparison depicts the same information (detailed later).

Figure 2:
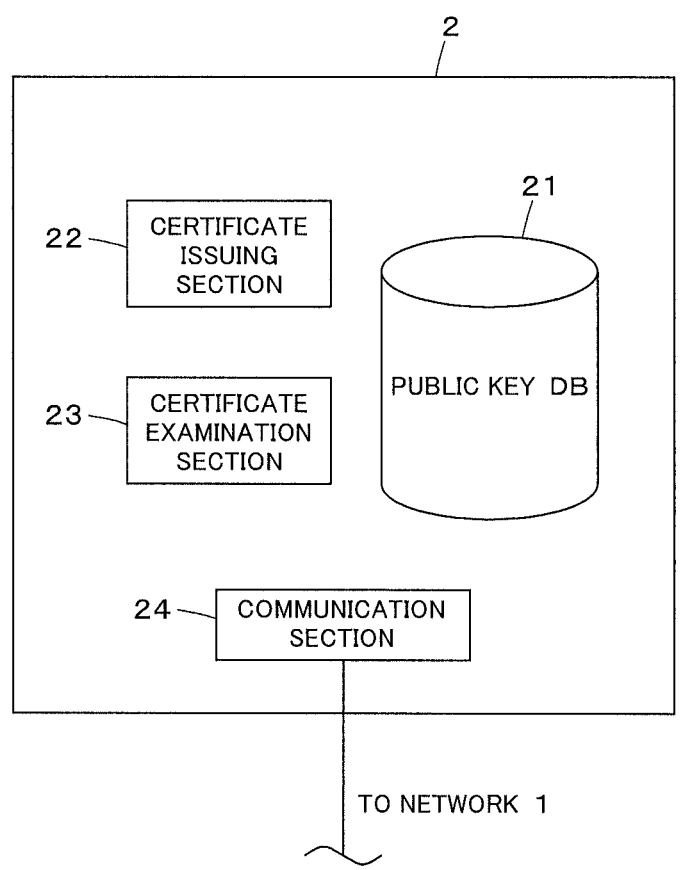
FIG. 2 is a configuration diagram of a certification organization server according to an embodiment of the present invention.

According to the technique, it is necessary to guarantee the validity of the certificate. Accordingly, like the present embodiment, it is common for a certification organization server 2 to be installed that accumulates public keys of a video recording terminal, a time delivery organization and an extractor. As illustrated in FIG. 2, the certification organization server 2 includes a public key DB 21 that stores public keys of a video recording terminal, a time delivery organization and an extractor; a certificate issuing section 22 that issues the public key certificate in response to a request; a certificate examination section 23 that examines the public key certificate; and a communication section 24 for communicating through the network 1.

Figure 3:
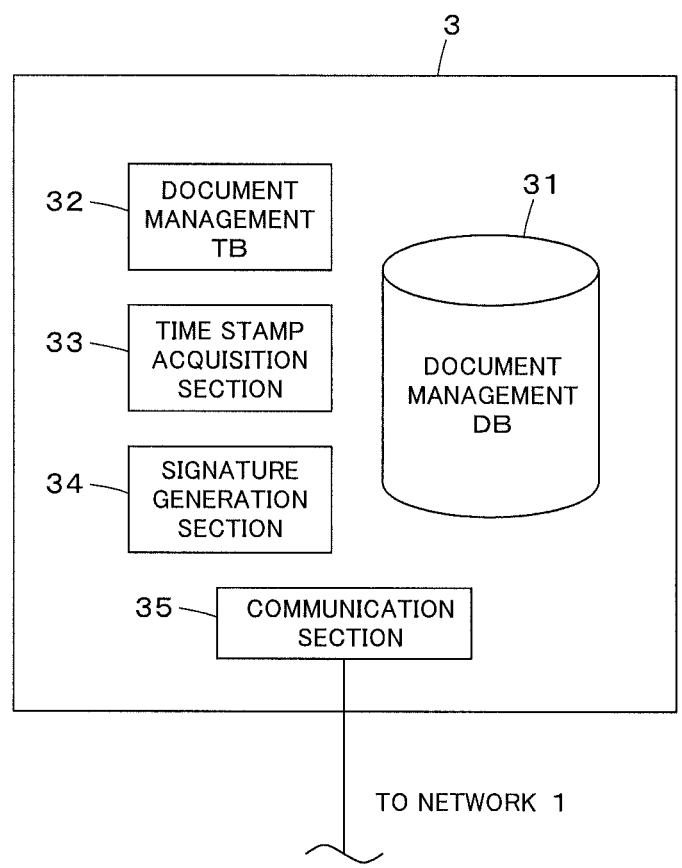
FIG. 3 is a configuration diagram of a signature generation server according to an embodiment of the present invention.

The reference numeral 3 denotes a signature generation server that stores information transmitted from a video recording terminal 4 described below and performs a signature process. As illustrated in FIG. 3, the signature generation server 3 includes a document management DB 31 that stores information transmitted from the video recording terminal 4 described below and information transmitted to an information extraction server 5 described below; a document management TB 32 that controls access to the document management DB 31; a time stamp acquisition section 33 that acquires date-and-time information guaranteed by a third party as described below; a signature generation section 34 that adds PIAT signature information of the video recording terminal 4 described below and an electronic signature to information; and a communication section 35 for communicating through the network 1.

The reference numeral 4 denotes a video recording terminal that constitutes a stream data generation terminal of the present invention and is a terminal for filming and recording information that is to be a target, i.e. original stream data (referred to as original moving image information, hereinafter). For example, the video recording terminal 4 is the equivalent of a commercial surveillance camera or the like. The video recording terminal 4 is capable of communicating with the signature generation server 3.

Figure 4:
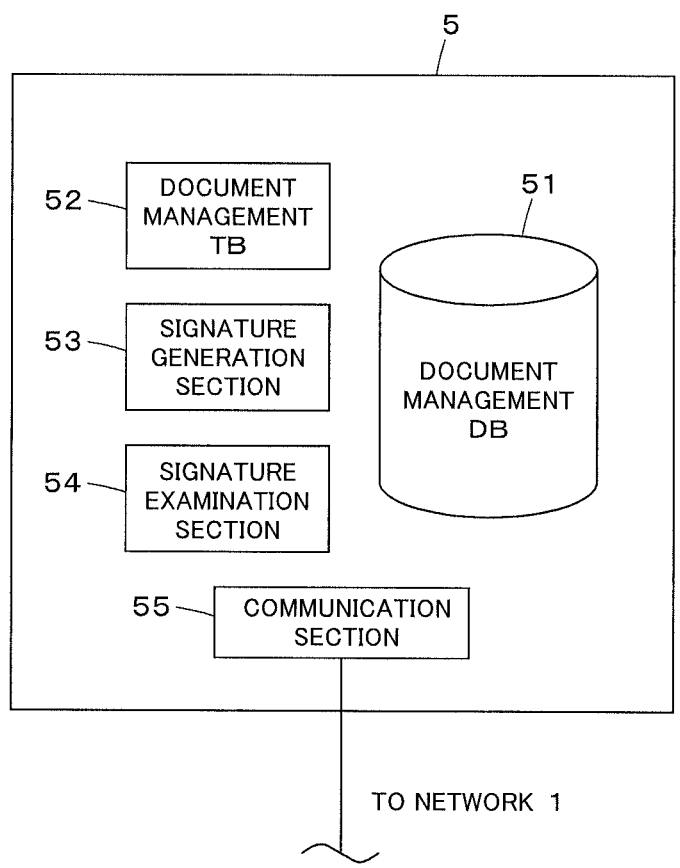
FIG. 4 is a configuration diagram of an information extraction server according to an embodiment of the present invention.

The reference numeral 5 denotes an information extraction server. As illustrated in FIG. 4, the information extraction server 5 includes a document management DB 51 that accumulates information transmitted from the signature generation server 3 and information transmitted to a signature examination server 7 described below: a document management TB 52 that controls access to the document management DB 51; a signature generation section 53 that adds PIAT signature information of an extractor and an electronic signature to information; a signature examination section 54 that examines an electronic signature attached to transmitted information; and a communication section 55 for communicating through the network.

The reference numeral 6 is a terminal that allows an extractor to operate the information extraction server 5. The extractor terminal 6 is capable of communicating with the information extraction server 5.

Figure 5:
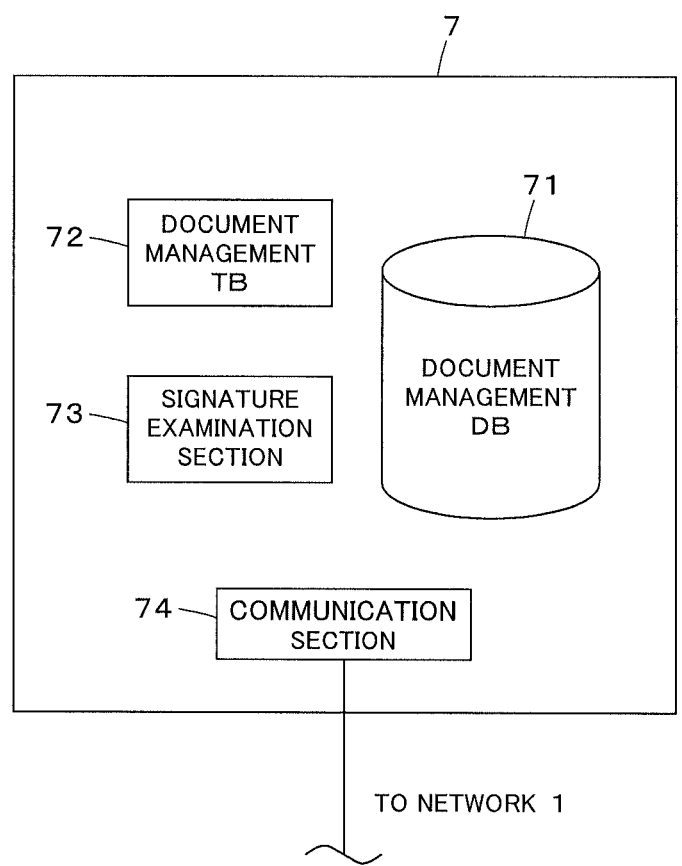
FIG. 5 is a configuration diagram of a signature examination server according to an embodiment of the present invention.

The reference numeral 7 denotes a signature examination server. As illustrated in FIG. 5, the signature examination server 7 includes a document management DB 71 that accumulates information transmitted from the information extraction server 5; a document management TB 72 that controls access to the document management DB 71; a signature examination section 73 that examines the electronic signature and PIAT signature information attached to transmitted information; and a communication section 74 for communicating through the network.

The reference numeral 8 denotes a terminal that allows an examiner to operate the signature examination server 7. The examiner terminal 8 is capable of communicating with the signature examination server 7.

Figure 6:
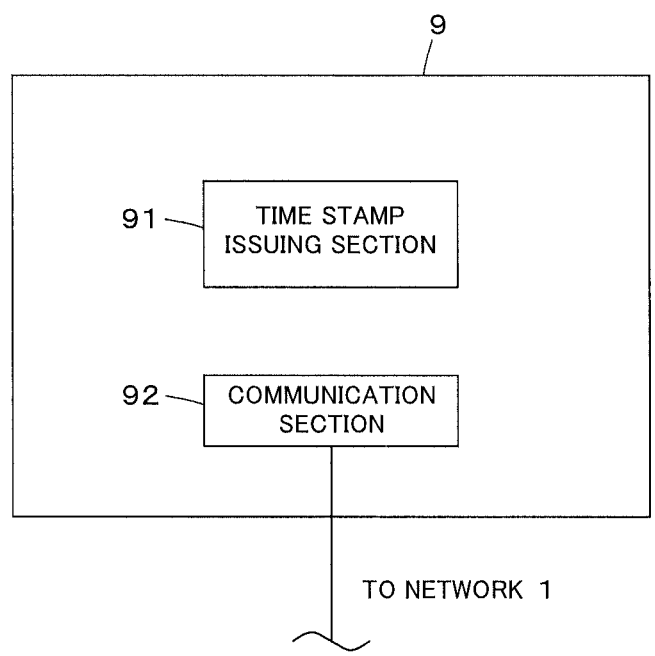
FIG. 6 is a configuration diagram of a time delivery organization server according to an embodiment of the present invention.

The reference numeral 9 is a time delivery organization server. As illustrated in FIG. 6, the time delivery organization server 9 includes a time stamp issuing section 91 that issues date-and-time information and adds an electronic signature; and a communication section 92 for communicating through the network.

Incidentally, the signature generation server 3 constitutes an original stream data generation section and original signature related information generation section of the present invention. The information extraction server 5 constitutes a cutout stream data generation section and cutout signature related information generation section of the present invention. The signature examination server 7 constitutes a verification section of the present invention.

The following describes a processing operation of the system having the above configuration.

Described first is an electronic signature process.

For the electronic signature, the sender generates a pair of keys (secret key and public key) in advance, transmits a public key to the certification organization server 2 to have a public key certificate issued, and stores the secret key and the public key certificate in a transmitting device. When the transmitting device transmits information, summary information (message digest) of signature target information is generated; information obtained by encrypting the summary information with a secret key of a sender is regarded as signature information. Subsequently, the signature target information, the signature information and the public key certificate of the sender are transmitted to an opposite party. The opposite party (receiver) who has received the signature target information, the signature information and the public key certificate examines the validity of the public key certificate of the sender acquired for the certification organization server 2. If the public key certificate is valid, the decoding of the signature information with the public key is carried out. Then, a summary of the signature target information is generated. If the summary is the same as the decoded information after comparison, it is possible to verify that the information is the real one transmitted from the sender and has not been altered.

The summary information here is information (hash information) calculated by using a cryptographic one-way hash function for the signature target information. Since it is possible to compress the signature target information in size, the summary information is also referred to as a message digest. The hash information generated by the cryptographic one-way hash function is the sole information that may be generated only from the signature target information and is characterized in that the original information may not be restored from the hash information generated. Therefore, the hash information is often used for encrypting of information and generating of electronic signatures. As for the cryptographic one-way hash function, there are such algorithms as MD5, SHA-1 and SHA-256. Information (hash information generation algorithm) about which algorithm is used to generate the summary information (hash information) for information is recorded in the public key certificate.

A process of generating an electronic signature will be detailed below.

Figure 7:
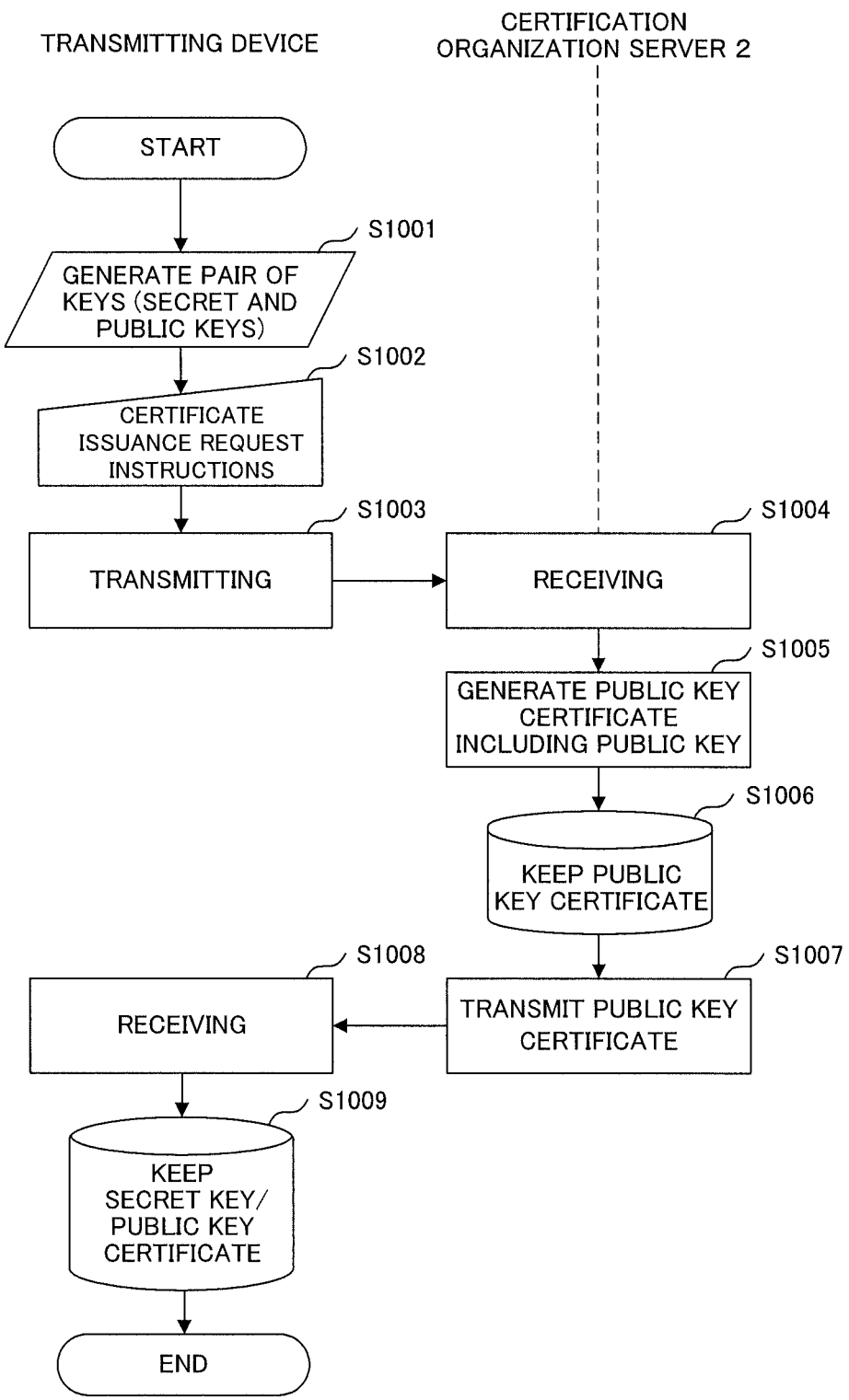
FIG. 7 is a flowchart illustrating a registration process of a public key between a transmitting device and the certification organization server according to an embodiment of the present invention.

First, a process of registering a public key between the transmitting device and the certification organization server 2 will be described with reference to a flowchart of FIG. 7.

Incidentally, in the system of FIG. 1, the signature generation server 3, the information extraction server 5 and the time delivery organization server 9 serve as transmitting devices for electronic signatures.

First, the sender generates a pair of keys (secret key and public key) (S1001). Subsequently, after the sender operates the transmitting device to input certificate issuance request information (S1002), the transmitting device transmits the input certificate issuance request information to the certification organization server 2 along with the public key (S1003).

The certificate issuing section 22 of the certification organization server 2 that has received the information through the communication section 24 (S1004) generates a public key certificate including the public key (S1005) and accumulates the generated public key certificate in the public key DB 21 (S1006).

Then, the certificate issuing section 22 controls the communication section 24 to transmit the issued public key certificate through the network 1 to the transmitting device that has transmitted the certificate issuance request information (S1007).

The transmitting device that has received the information (S1008) accumulates the secret key generated at S1001 and the public key certificate issued by the certification organization server 2 in a storage device that the transmitting device has (a storage area inside the signature generation section 34 of the signature generation server 3, a storage area inside the signature generation section 53 of the information extraction server 5, or a storage area inside the time stamp issuing section 91 of the time delivery organization server 9) (S1009) and ends the process.

Figure 8:
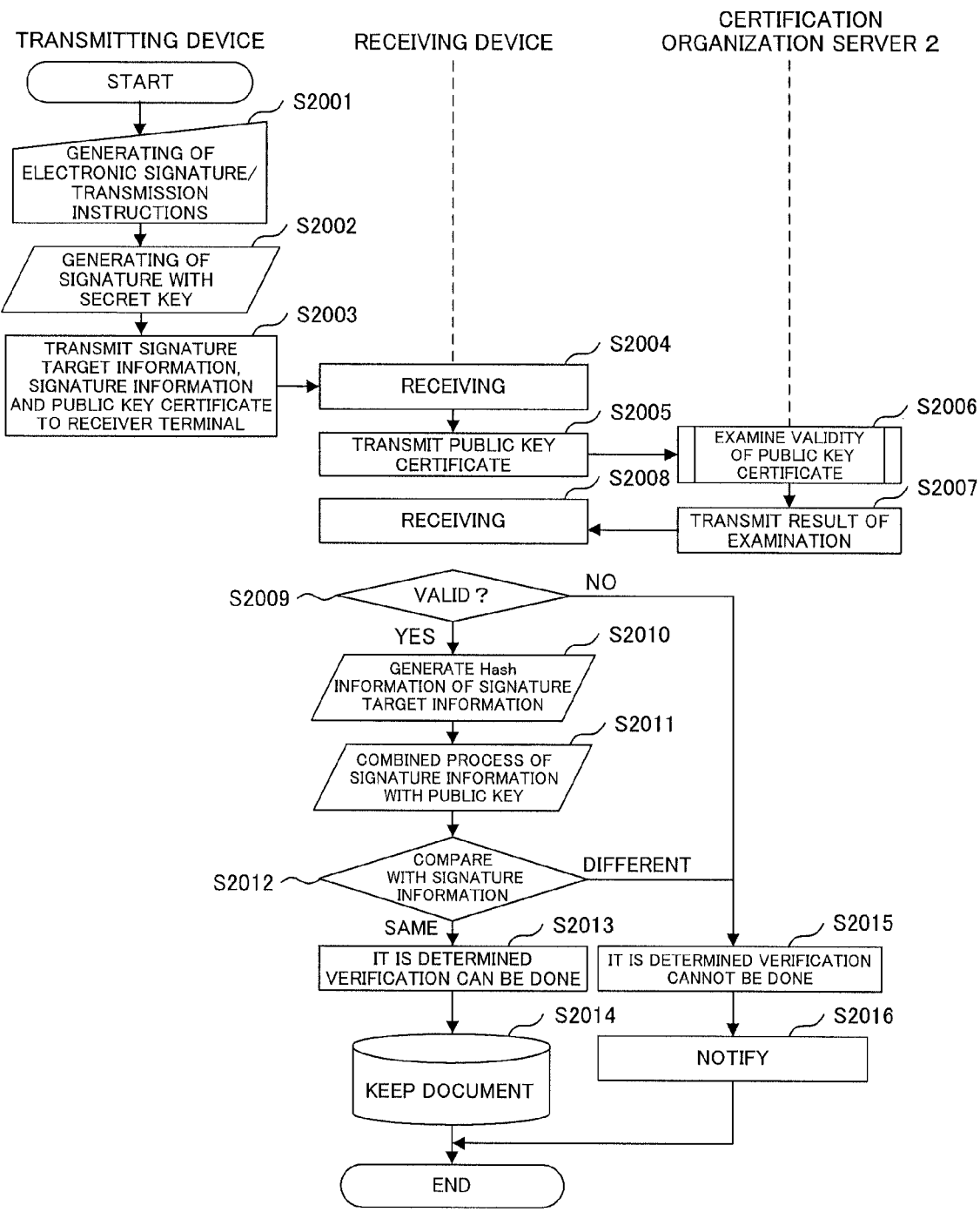
FIG. 8 is a flowchart illustrating a transmitting/receiving process of information to which an electronic signature is attached and an examination process of a receiving device.

The following describes a transmitting/receiving process for electronic signature-attached information and an examination process by a receiving device with reference to a flowchart of FIG. 8.

First, after the sender inputs instructions to generate an electronic signature for the given signature target information and transmit to the receiving device (S2001), the transmitting device encrypts the summary information (hash information) of the signature target information that is stored in the storage area and specified by the secret key (S2002) and transmits the summary information to the receiving device along with the public key certificate that is similarly stored (S2003).

The receiving device that has received the above kinds of information (S2004) transmits the public key certificate to the certification organization server 2 in order to confirm the period of validity of the transmitted public key certificate, expiration information and the like (S2005). In this case, suppose that the certification organization server 2 supports a series of functions for issuing and examining the certificate. Then, the certification organization server 2 examines the validity of the public key certificate received (S2006) and transmits the result of examination to the receiving device (S2007). The receiving device that has received the result of validity examination (S2008) confirms whether the public key certificate is valid (S2009). When it is confirmed that the public key certificate is valid, the receiving device makes reference to a hash information generation algorithm included in the sender's public key certificate acquired from the transmitting device and generates hash information from the signature target information received from the transmitting device (S2010). Subsequently, using the public key included in the public key certificate, the receiving device performs a decoding process for the signature information received from the transmitting device (S2011). The receiving device compares the hash information generated at S2010 with the information obtained by the decoding process of S2011 and makes a determination as to whether the hash information and the obtained information are the same (S2012). When it is confirmed as a result of the determination that the hash information and the obtained information are the same, it is proven that the hash information and the obtained information are those transmitted from the transmitting device (sender) and have not been altered (S2013) and the hash information and the obtained information are stored (S2014).

When the hash information and the information obtained by the decoding process are different it is determined that the information may not be proven to be the one from the transmitting device (sender) (or that the information has been altered during communication; the determination may be made in other ways) (S2015). The receiving device performs a notification process, such as displaying a message for an operator of the receiving device that says it is impossible to prove (S2016). During the process of S2009, it is similarly determined that the information may not be proven to be the one from the transmitting device (S2015) when the validity of the public key certificate may not be confirmed; the receiving device performs a notification process, such as displaying a message for an operator of the receiving device that says it is impossible to prove (S2016).

Figure 9:
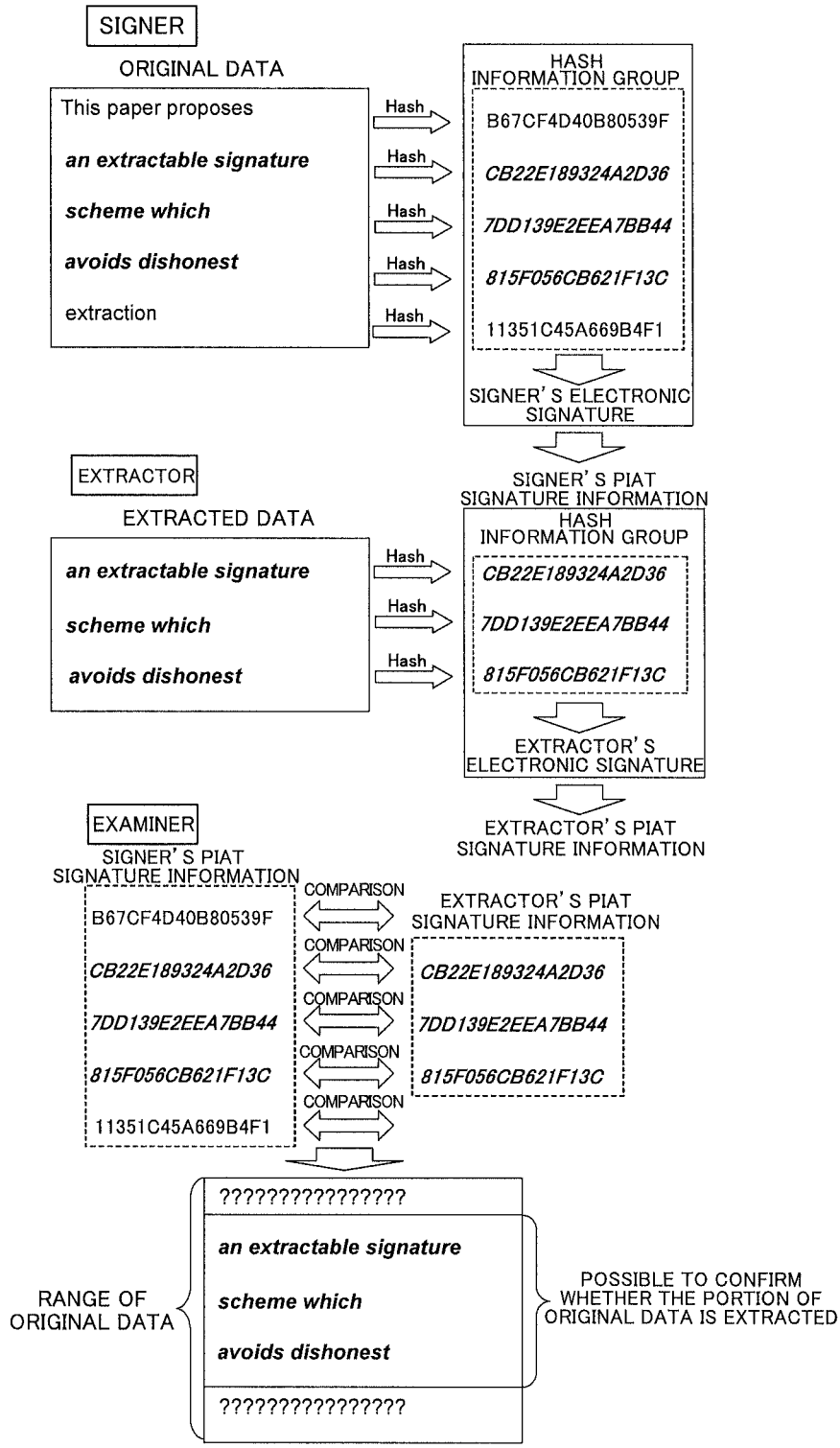
FIG. 9 is a diagram illustrating an outline of a PIAT algorithm.

An outline of the PIAT algorithm will be described with reference to FIG. 9.

A signer divides the signature target data into data portions, calculates the hash information of each data portion, and generates a hash information group. After that, the signer puts the signer's electronic signature to the generated hash information group and regards the hash information group and the electronic signature collectively as PIAT signature information.

The extractor extracts a data portion from the data to which the signer has applied the PIAT signature information (and deletes the remaining data portions). After that, the extractor carries out the same operation as the signer does to generate the extractor's PIAT signature information.

The examiner examines the integrity of the hash information group from the signer's PIAT signature information and the extractor's PIAT signature information. Then, the examiner generates a hash information group from the disclosed data portion and examines whether the hash information group is the same as the hash information group included in the extractor's PIAT signature information. Finally, by comparing the signer's hash information group and the extractor's hash information group, the same portion of the hash information proves to be an extraction position from the original data. If the hash information of the signer's PIAT signature information is not included in the hash information of the extracted data, it is clear that the data portion has been altered.

The following describes and defines streaming information, which is a target of the present embodiment. Typical moving image formats include MPEG1/2/4; audio formats include MP3 (MPEG1 Audio Layer-3), WAV and the like. According to the present embodiment, MPEG1 will be described.

There are various versions of the MPEG1 format. What are examined here are applications to moving images whose images are relatively simple. The target is a Video frame of MPEG1 from which an audio portion has been removed in order to simplify. What are examined are applications to a CBR (Constant Bit Rate) method and to an ES (Elementary Stream) that handles only images encoded in MPEG1. Hereinafter, the target format is simply referred to as MPEG1.

Figure 10:
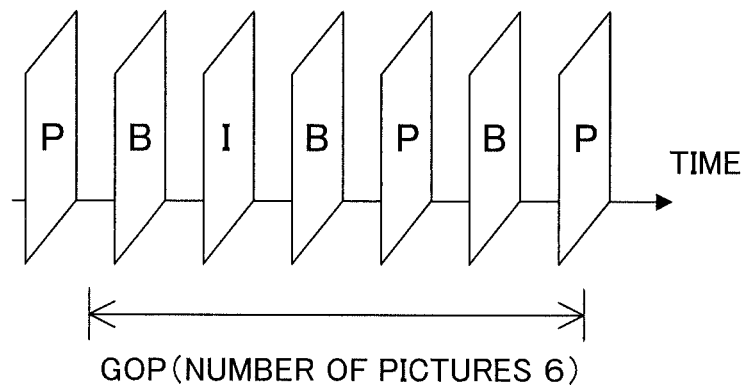
FIG. 10 is a diagram illustrating an example of an image type of MPEG1 and arrangement thereof.

MPEG1 is a moving image encoding technique standardized in ISO/IEC 11172-2. Moving images are realized by displaying still images at relatively high speed. For example, about 30 images are displayed per second for television. The number of images displayed per second is referred to as a frame rate. According to the moving image encoding technique, a (still) image compression process that relies on encoding and a compression process that relies on inter-frame prediction encoding are performed in order to reduce the amount of data. According to MPEG1, a DCT technique is employed for the still image compression process and a bilateral prediction technique for the inter-frame prediction encoding. According to MPEG1, for bilateral prediction, there are three types of a retaining method of still images. FIG. 10 illustrates an example of an image type of MPEG1 and arrangement thereof.

An I frame retains all compressed image data needed to display. A P frame is called an inter-frame prediction image. With the most recently decoded image of I or P frame being regarded as a reference image, the P frame retains only values of difference from the reference image and the like. With the most recently decoded images of the future and past I frames and P frames being regarded as reference images, a B frame retains values of difference from the reference images and the like. For P and B frames, the differences between preceding and subsequent images are taken to eliminate time-direction redundancy, allowing a high level of data compression to be achieved. According to MPEG1, as illustrated in FIG. 10, some of the images are put together into the smallest unit of moving images called GOP (Group of Pictures). The unit of GOP may be played independently with the above unit. The structure of GOP allows a moving image to be played or edited from the middle.

Figure 11:
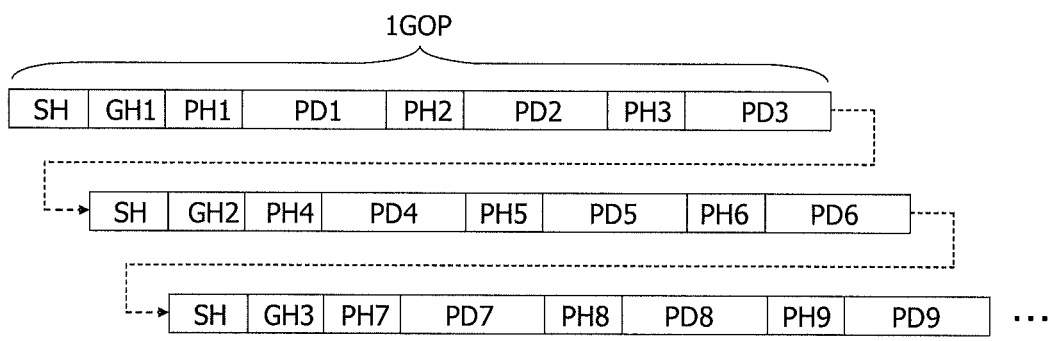
FIG. 11 is a diagram illustrating an example of a Video frame structure of MPEG1 according to an embodiment of the present invention.

FIG. 11 illustrates an example of the frame structure of MPEG1. The Video frame of MPEG1 includes a sequence header (referred to as a SH, hereinafter), a GOP header (referred to as a GH, hereinafter), picture headers (referred to as PHs, hereinafter) and picture data (which is layer data that follows a PH and hereinafter referred to as PD). In particular, recorded in the SH are common parameters across the entire video sequence, such as information representing the size of an image, the number of frames encoded per second, and information about communication speed.

The following describes an application of PIAT to MPEG1 in the system of the present embodiment with reference to flowcharts of FIGS. 12 to 16.

Before the specific flow of the process is described, the premises of the present embodiment are defined. First, what is considered is a case in which the video recording terminal 4 that records the original moving image information adds the signature. For example, the video recording terminal 4 is equivalent to a surveillance camera, a commercial camera or the like. The video recording terminal is connected to the time delivery organization server 9 via the network 1 to properly receive and acquire the date-and-time information guaranteed by a third party and is expected to divide the recorded video into given time units before saving. The premise is that saving is performed at intervals of one hour. The frame rate and the number of pictures included in each GOP of each piece of original moving image information are fixed and it is easy to identify a playing time in the original moving image information.

According to the present embodiment, three operators, an administrative manager of the video recording terminal 4, an extractor and an examiner, appear. By pushing a recording start button/recording stop button that the video recording terminal 4 is equipped with, the administrative manager issues video recording starting/stopping instructions to the video recording terminal 4; the extractor generates cutout moving image information by cutting out a portion of the target original moving image information; and the examiner examines the disclosed cutout moving image information.

Moreover, the following conditions are set for the video recording terminal 4, the extractor and the examiner. The video recording terminal 4 guarantees the contents of the signature-target original moving image information by putting the signature. It is preferable to put the signature under the condition that it is unknown which portion of the target original moving image information is due to be extracted. The extractor partially extracts data from the original moving image information to which the video recording terminal 4 has added the signature and discloses the data as the cutout moving image information to the examiner. There are two extraction methods: a prominent name extraction method in which information about the extractor is simultaneously disclosed to make it clear who has performed the extraction process, and an anonymous extraction method in which the extractor performs the extraction process anonymously.

The present embodiment is described based on the assumption that the prominent name extraction method is carried out. The examiner examines whether the disclosed cutout moving image information is guaranteed by the video recording terminal 4. The disclosed cutout moving image information is examined as to whether the disclosed cutout moving image information is part of the original moving image information to which the video recording terminal 4 has added the signature as well as whether the extraction is carried out by the extractor. Incidentally, as for the electronic signature process, the devices each carry out the above procedures of electronic signature.

Figure 12:
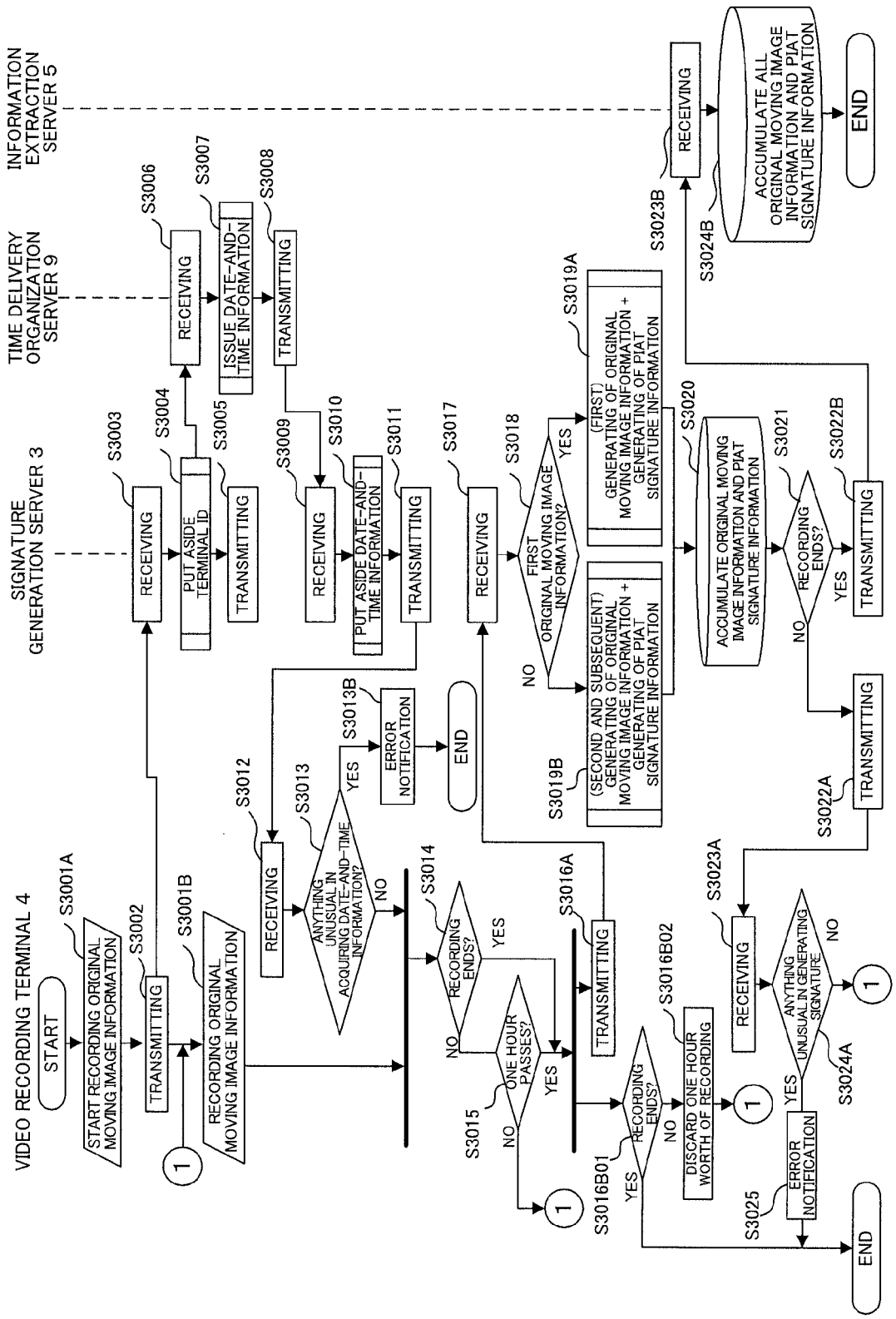
FIG. 12 is a flowchart illustrating a video recording and signature generation process according to an embodiment of the present invention.

First, a first embodiment of the present invention will be described. As illustrated in FIG. 12, the video recording terminal 4 starts recording the signature-target original moving image information (S3001A). The administrative manager of the video recording terminal 4 instructs the video recording terminal 4 to start recording, for example by pushing the recording start button the video recording terminal 4 is equipped with. Suppose that the video images being recorded are to be accumulated in a storage area of the video recording terminal 4.

At the same time as the recording starts, the video recording terminal 4 transmits a acquisition request for data-and-time information to the signature generation server 3 (S3002). At this time, the video recording terminal 4 transmits, along with the acquisition request, a terminal ID uniquely assigned.

After receiving the acquisition request for data-and-time information and the terminal ID from the video recording terminal 4 through the communication section 35 (S3003), the signature generation server 3 puts aside the received terminal ID (S3004). The putting aside of the received terminal ID is performed, for example, by temporarily recording the received terminal ID in a storage area inside the document management DB 31 of the signature generation server 3.

Subsequently, the time stamp acquisition section 33 transmits an issuance request for date-and-time information to the time delivery organization server 9 through the communication section 35 (S3005). The time delivery organization server 9 receives the issuance request for date-and-time information from the signature generation server 3 through the communication section 92 (S3006); the time stamp issuing section 91 acquires and issues the current date-and-time information and adds the electronic signature of the time delivery organization to the issued date-and-time information (S3007). The time delivery organization server 9 transmits the date-and-time information to which the issued electronic signature is attached to the signature generation server 3 through the communication section 92 (S3008).

The signature generation server 3 receives the date-and-time information to which the electronic signature of the time delivery organization is attached from the time delivery organization server 9 through the communication section 35 (S3009) and puts aside the received date-and-time information to which the electronic signature is attached (S3010). The putting aside of the date-and-time information is performed, for example, by temporarily recording the date-and-time information in a storage area inside the document management DB 31 of the signature generation server 3. The signature generation server 3 transmits a date-and-time information acquisition completion notification to the video recording terminal 4 through the communication section 35 (S3011).

The video recording terminal 4 receives the date-and-time information acquisition completion notification from the signature generation server 3 (S3012). In parallel with the flow of the date-and-time information acquisition process that has been carried out so far (the processes of S3002 to S3012), the video recording terminal 4 continuously records the original moving image information (S3001B). If anything unusual occurs in the time-and-date information acquisition process (S3013: YES), the video recording terminal 4 in some way informs the administrative manager accordingly (S3013B). When anything unusual happens, the administrative manager performs a process of stopping the recording of the original moving image information at the time to end.

Meanwhile, when the video recording terminal 4 receives a notification depicting that the acquiring of the date-and-time information is properly completed (S3013: NO), the video recording terminal 4 then enters a process of making a determination as to whether to end the recording of the original moving image information (S3014). The administrative manager instructs the recording of the original moving image information to be ended, for example, by pushing the recording stop button the video recording terminal 4 is equipped with. At the time when the recording is ended (S3014: YES), the flow of subsequent processes shifts to S3016A. The subsequent processes will be described later.

When the recording of the original moving image information is not ended (S3014: NO), the video recording terminal 4 then enters a process of making a determination as to whether one hour, which is a division retaining unit, has passed (S3015). For a method of determining whether one hour has passed since the start of the recording, what is conceivable is, for example, that if a service is carried out by the time delivery organization server 9 to automatically notify after one hour has passed since the issuance of the date-and-time information, the signature generation server 3 uses the service to notify the video recording terminal 4. For another method, what is conceivable is that after one hour has passed since the date-and-time information is received at S3009, the signature generation server 3 notifies the video recording terminal 4. For still another method, what is conceivable is that with a counter clock installed inside the video recording terminal 4, a determination is made as to whether one hour has passed. Even with any of the above ways, the acquiring of the date-and-time information used for verification after the fact is performed through the network 1 for the time delivery organization server 9 and passes from sever to server (on communication). Here, a time lag on the communication is not necessarily zero and some kind of action needs to be taken. However, according to the embodiment of the present embodiment, the time lag is regarded as an error (which means the time lag is not taken into account). The following description is based on the assumption that the acquiring of the date-and-time information from the time delivery organization server 9 is carried out in a timely manner without any errors and that the date-and-time information is properly acquired.

When one hour has not passed (S3015: NO), the video recording terminal 4 returns to S3001B and continues recording the original moving image information. When one hour has passed (S3015: YES), the video recording terminal 4 transmits a signature generation request to the signature generation server 3 (S3016A). At this time, the video recording terminal 4 transmits to the signature generation server 3 one hour worth of original moving image information accumulated in the storage area of the video recording terminal 4 and the fact that the signature generation request is made because one hour has passed. At the time when the signature generation request is transmitted, the original moving image information stored in the storage area of the video recording terminal 4 is discarded (S3016B02), and the next one hour worth of original moving image information continues to be recorded. At this time, if there is space on the storage area of the video recording terminal 4, the original moving image information may not be discarded at the same time as when the signature generation request is transmitted; the original moving image information may be accumulated until the recording of the original moving image information or the generating of the signature ends. Since the main object of the video recording terminal 4 is a function of recording video, it is expected to be difficult to secure a relatively large amount of space on the storage area of the video recording terminal 4. Accordingly, the original moving image information may not be discarded at the same time as when the signature generation request is transmitted. For example, management may be conducted by providing another accumulation server that serves as a backup in addition to the signature generation server 3.

When the recording is stopped by the administrative manager (S3014: YES), the video recording terminal 4 transmits to the signature generation server 3 the original moving image information accumulated in the storage area of the video recording terminal 4 and the fact that the signature generation request is made because the recording is stopped (S3016A). At the time when the transmitting is completed, the video recording terminal 4 ends the process (S3016B01: YES).

The signature generation server 3 receives the signature generation request transmitted at S3016A from the video recording terminal 4 through the communication section 35 (S3017) and makes a determination as to whether the signature generation request is the first one (first time) (S3018). The determination may be made by the signature generation server 3, for example, by using incremental counting to store how many times the signature generation request is received from the video recording terminal 4.

Figure 13:
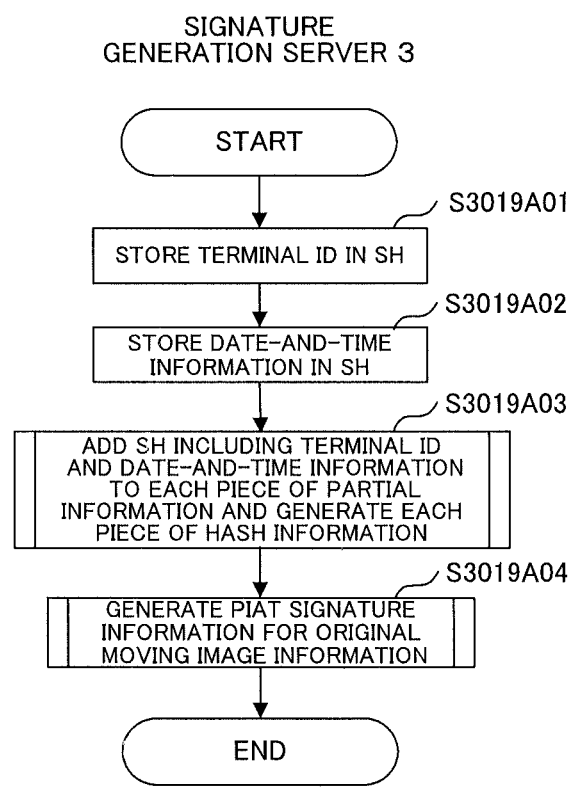
FIG. 13 is a flowchart illustrating a video recording and signature generation process according to an embodiment of the present invention.

The following describes the signature generation process (S3019A) that is performed when the signature generation request is the first one (S3018: YES). FIG. 13 illustrates a flowchart of the first signature generation process. First, the signature generation server 3 stores the terminal ID, which is put aside at S3004, in a user data area of the SH of the one hour worth of original moving image information transmitted from the video recording terminal 4 (S3019A01). Similarly, the date-and-time information to which the electronic signature of the time delivery organization is attached, which is put aside at S3010, is stored (S3019A02). The present embodiment does not refer to the structure of the user data area inside the SH and the storage method. Suppose that there is such an area.

The following describes a signature generation method for the original moving image information. The signature generation method for the original moving image information begins with a process of dividing the original moving image information into pieces of partial information. When the MPEG1 data is divided into data portions so that extraction is possible, there is no independence of a PD unit since the inter-frame prediction technique is used. Therefore, extraction may be restricted. According to the present invention, as for the frame structure as illustrated in FIG. 11, the SH serves as the top, the portion that continues until the PD followed by the subsequent SH (or the subsequent GH if there is no SH) appears is regarded as one GOP (a data portion of MPEG1), and the dividing of the MPEG1 data into data portions is performed on a GOP basis for simplification.

Furthermore, when the recording time of the moving image is long or when the frame rate of the moving image is high (the number of frames or GOPs is large), the amount of data of the hash information group included in the PIAT signature information may increase. To address the increase in the amount of data, it is possible to reduce the amount of signature-related data by using such inventions as the one disclosed in the above Japanese Patent Application No. 2007-12048. Given the above, the PIAT algorithm is applied. Incidentally, since the object is to extract the moving image data, the premise is that of all data, one portion of the consecutive moving images is cut out according to the present embodiment.

Figure 17:
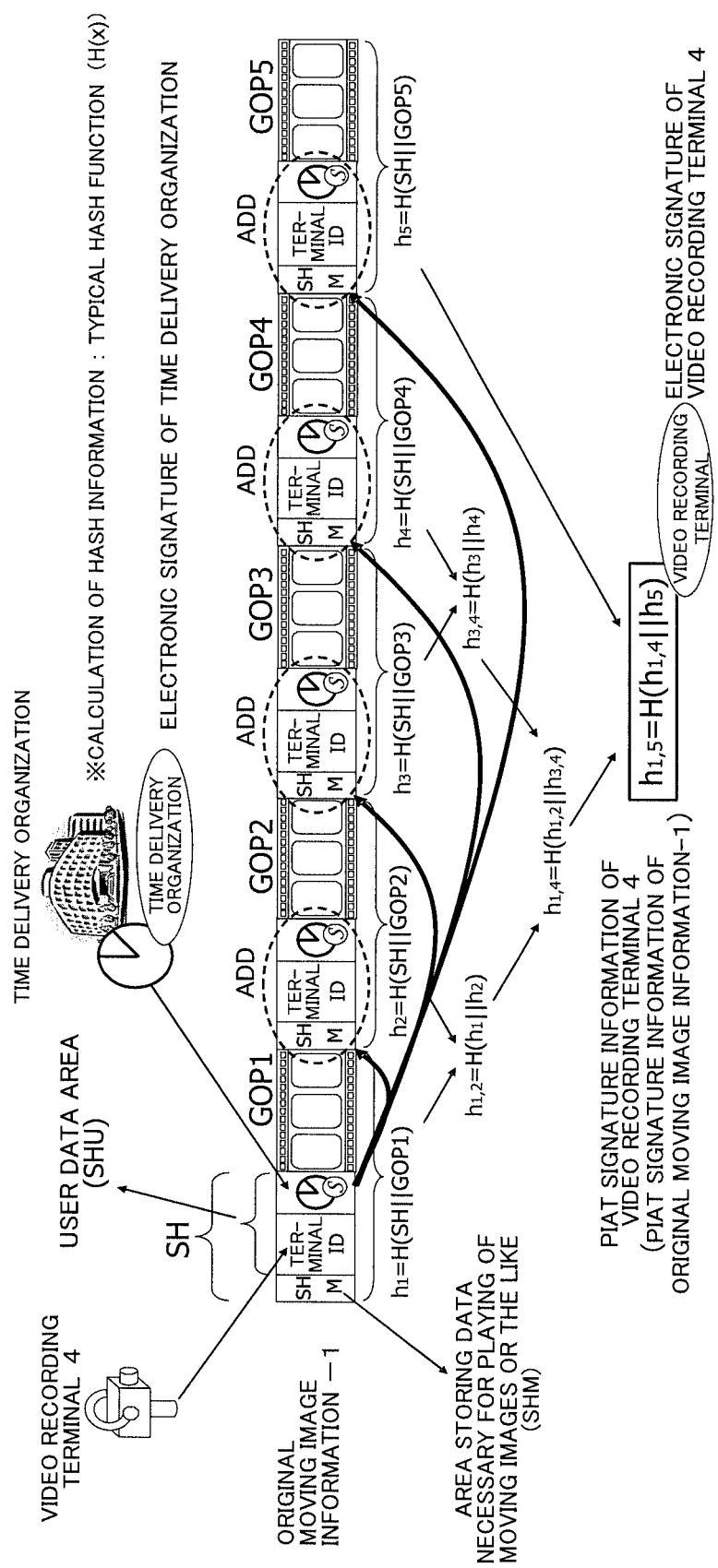
FIG. 17 is a diagram illustrating a signature generation method for original moving image information-1 according to an embodiment of the present invention.

The signature generation section 34 generates the PIAT signature information for the original moving image information. FIG. 17 illustrates how the generation method works. In practice, if the frame rate is expected to be 29.97, one GOP is expected to be about 500 milliseconds, and the number of pictures included in one GOP is expected to be about 18, the number of GOPs for about one hour (60 minutes) may differ depending on conditions for generating the moving image data but may be around 6,000. However, according to the present embodiment, for purposes of simplification of explanation, suppose that 5 GOPs (partial information), from GOP1 to GOP5, are one hour worth of GOPs; the following description is based on the assumption that the 5 GOPs constitute one original data item. First, the original moving image information is divided by GOP, and the hash information of each GOP is calculated. At this time, when the frame structure is like the one illustrated in FIG. 18, it is unknown from which position the GOP is cut out at the time when the signature of the original moving image information is put. Therefore, the contents of the most recent SH are added to the GOP to which the SH is not added; the hash information is generated so as to include the SH. However, the adding of the SH is not recorded in the actual body of the original moving image information; the adding of the SH means that the SH is added, for example, on the storage area (memory or the like) when the hash information is generated.

The SH may be separated into the following areas: an area (SHM) that stores data necessary for such processes as playing moving images, and a user data area (SHU) where a user may freely store data. At this time, the signature generation server 3 generates the hash information by adding the terminal ID, which is stored in the SHU at S3019A01, and the contents of the SH including the date-and-time information to which the electronic signature of the time delivery organization is attached, which is similarly stored in the SHU at S3019A02 (S3019A03). Moreover, using the group of hash information and a method of managing hash information with the use of a binary tree (referred to as a binary tree method, hereinafter), which is famous in the field of encryption systems, the signature generation server 3 generates one piece of root hash information. After that, the signature generation server 3 generates the electronic signature of the video recording terminal 4 for the generated root hash information and regards the root hash information and the electronic signature collectively as the PIAT signature information of the video recording terminal 4 (S3019A04).

Figure 19:
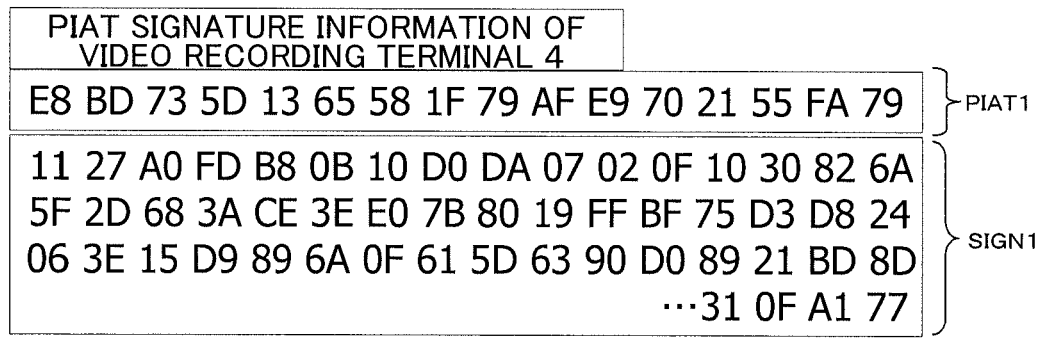
FIG. 19 is a diagram illustrating the contents of PIAT signature information of a video recording terminal according to an embodiment of the present invention.

FIG. 19 illustrates the contents of the PIAT signature information of the video recording terminal 4. In the example here, the root hash information is recorded as examination information for the original moving image information. To generate the root hash information, MD5 is used as a cryptographic one-way hash function. FIG. 19 illustrates how to record with a capacity of 16 bytes (PIAT1). SIGN1 represents the electronic signature of the video recording terminal 4 for the examination information (root hash information). According to the present embodiment, the examination information for the original moving image information and the electronic signature of the video recording terminal 4 are put together before being recorded as the PIAT signature information. However, the examination information for the original moving image information and the electronic signature may be recorded and managed separately.

After the PIAT signature information of the original moving image information is generated, the signature generation server 3 accumulates, through the document management TB 32 of the signature generation server 3, the original moving image information and the PIAT signature information in pairs in the document management DB 31 (S3020 of FIG. 12). There are the following methods of recording and managing the PIAT signature information: a method of recording and managing a group of hash information for the original moving image information and the electronic signature after the group of hash information and the electronic signature are put together into the PIAT signature information, and a method of separately recording and managing the group of hash information for the original moving image information and the electronic signature. Moreover, according to the present embodiment, the root hash information is recorded as the examination information for the original moving image information by using the binary tree method. The reason the binary tree method is used is to reduce the amount of signature data. If no consideration is given to the reduction in the amount of signature data, the group of hash information of each GOP may be recorded without change.

Figure 14:
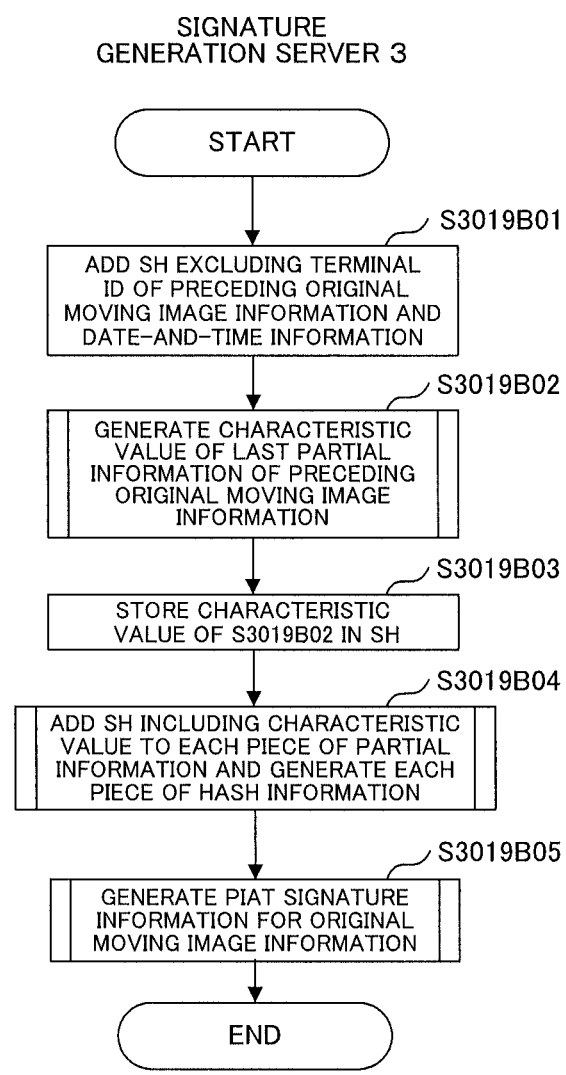
FIG. 14 is a flowchart illustrating a video recording and signature generation process according to an embodiment of the present invention.

The following describes the signature generation process (S3019B) that is performed when the signature generation request is the second one (S3018: NO). FIG. 14 illustrates a flowchart of the second and subsequent signature generation process. First, the signature generation server 3 adds the SH (SHM) as the actual body of the SHM of the original moving image information, excluding the terminal ID of the preceding original moving image information stored in the SHU of the one hour worth of original moving image information transmitted from the video recording terminal 4 and the date-and-time information (S3019B01). According to the present embodiment, the SH including the terminal ID and the date-and-time information is only for the first original moving image information. Only the SHM that does not include the terminal ID and the date-and-time information is added to the second or subsequent original moving image information.

Then, the signature generation server 3 generates a characteristic value based on the last GOP information (LGOP in FIG. 20) of the preceding original moving image information (S3019B02). The characteristic value turns out to be information indicating that there is a connection (link) to the preceding original moving image information. The generated characteristic value is stored in the SHU of the original moving image information (S3019B03). Incidentally, according to the present embodiment, the stored characteristic value is the hash information generated based on the last GOP information (LGOP in FIG. 20) of the preceding original moving image information. Instead, the PIAT signature information of the preceding original moving image information may be stored.

Figure 20:
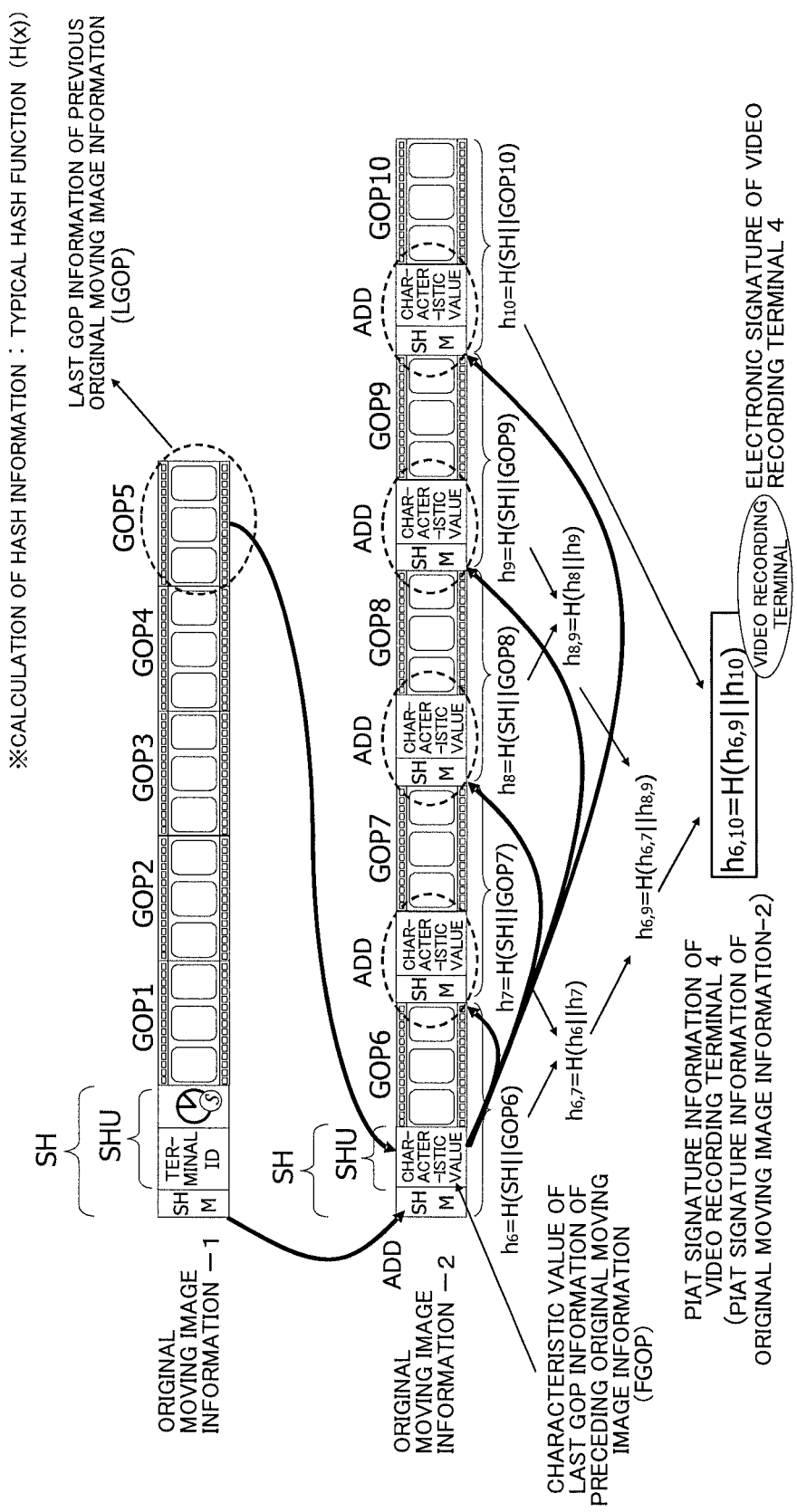
FIG. 20 is a diagram illustrating a signature generation method of original moving image information-2 according to an embodiment of the present invention.

The following describes a signature generation method for the original moving image information. In the same way as the signature is generated for the first original moving image information, the signature generation section 34 generates the PIAT signature information for the original moving image information. FIG. 20 illustrates how the generation method works. First, the original moving image information is divided by GOP, and the hash information of each GOP is calculated. At this time, like the generating of the signature for the first original moving image information, the contents of the most recent SH are added to the GOP to which the SH is not added; the hash information is generated so as to include the SH. The adding of the SH is not recorded in the actual body of the original moving image information; the adding of the SH means that the SH is added, for example, on the storage area (memory or the like) when the hash information is generated.

At this time, the signature generation server 3 generates the hash information by adding the contents of the SH including the characteristic value (FGOP) of the last GOP information of the preceding original moving image information that is stored in the SHU at S3019B03 (S3019B04). Using the group of hash information and the binary tree method, the signature generation server 3 generates one piece of root hash information. After that, the signature generation server 3 generates the electronic signature of the video recording terminal 4 for the generated root hash information and regards the root hash information and the electronic signature collectively as the PIAT signature information of the video recording terminal 4 (S3019B05).

After the PIAT signature information of the original moving image information is generated, the signature generation server 3 accumulates, through the document management TB 32 of the signature generation server 3, the original moving image information and the PIAT signature information in pairs in the document management DB 31 (S3020 of FIG. 12). Even for the second and subsequent processes of recording and managing the PIAT signature information, there are the following methods: a method of recording and managing a group of hash information for the original moving image information and the electronic signature after the group of hash information and the electronic signature are put together into the PIAT signature information, and a method of separately recording and managing the group of hash information for the original moving image information and the electronic signature. Moreover, according to the present embodiment, the root hash information is recorded as the examination information for the original moving image information by using the binary tree method. The reason the binary tree method is used is to reduce the amount of signature data. If no consideration is given to the reduction in the amount of signature data, the group of hash information of each GOP may be recorded without change.

Figure 21:
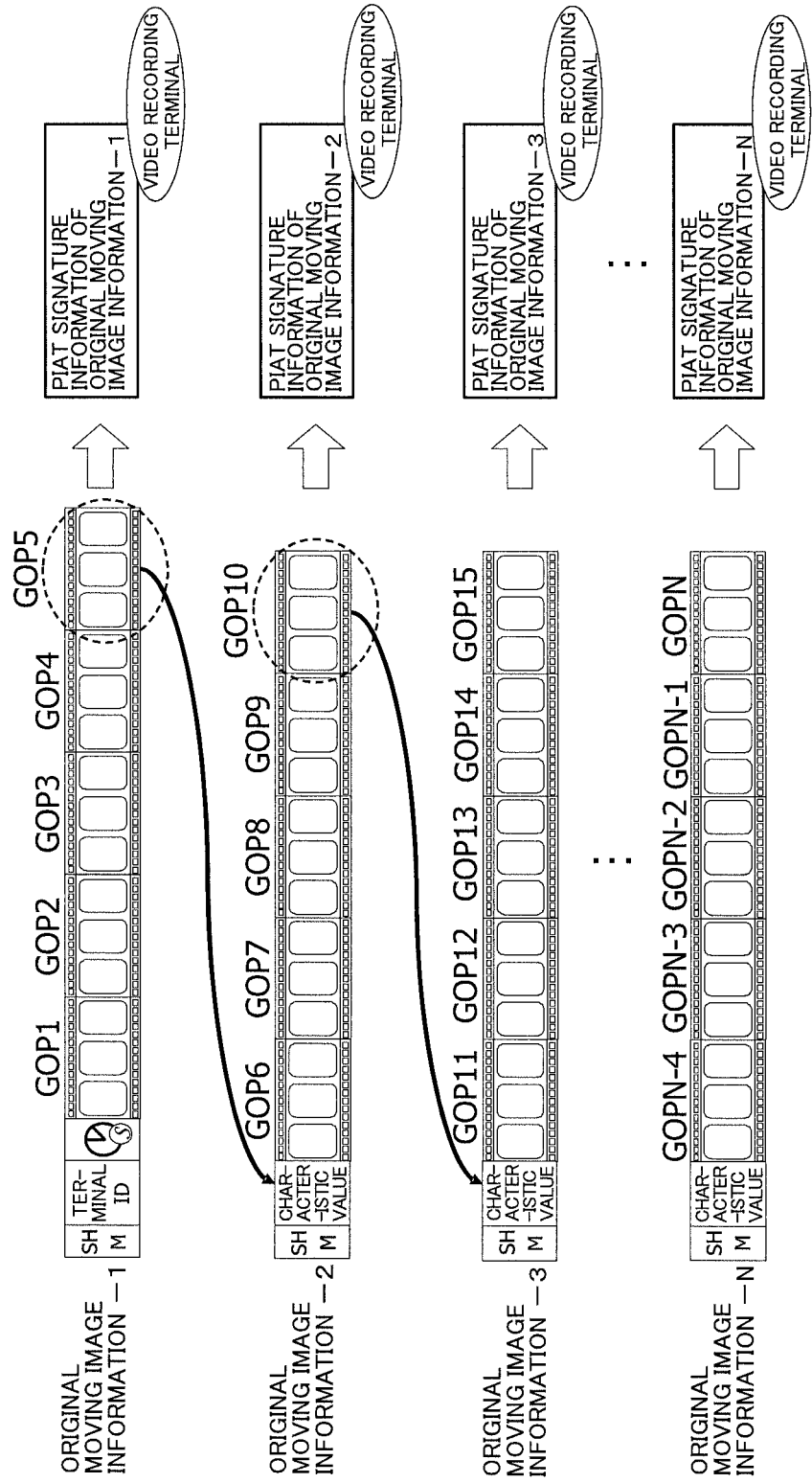
FIG. 21 is a diagram illustrating an accumulation state of all original moving image information and PIAT signature information according to an embodiment of the present invention.

The processes described above complete generating the signature for the first, second and subsequent original moving image information. FIG. 21 illustrates an accumulation state at a time when the original moving image information-1 to original moving image information-N are produced according to the above method and the PIAT signature information of each piece of original moving image information is generated.

When the signature generation request has been issued at S3016A after one hour has passed (S3021: NO), the signature generation server 3 transmits a signature generation completion notification to the video recording terminal 4 through the communication section 35 (S3022A). Then, the video recording terminal 4 receives the signature generation completion notification (S3023A); when the process is normal (S3024A: NO), the video recording terminal 4 continues the recording of the next one hour worth of original moving image information. When the video recording terminal 4 receives anything unusual about the process from the signature generation server 3 at the time (S3024A: YES), the video recording terminal 4 in some way notifies the administrative manager accordingly (S3025A). When anything unusual happens, the administrative manager carries out a process of stopping the recording of the original moving image information at the time to end.

When the signature generation request has been issued at S3016A due to the ending of the recording (S3021: YES), the signature generation server 3 takes out all pairs of original moving image information and PIAT signature information, from the original moving image information-1 to original moving image information-N accumulated in the document management DB 31, through the document management TB 32 and transmits all the taken-out pairs of original moving image information and PIAT signature information to the information extraction server 5 through the communication section 35 (S3022B). The information extraction server 5 receives all the pairs of original moving image information and PIAT signature information through the communication section 55 (S3023B) and accumulates all the original moving image information and PIAT signature information in pairs in the document management DB 51 through the document management TB 52 of the information extraction server 5 (S3024B). According to the present embodiment, the signature generation server 3 and the information extraction server 5 exist separately so that the function of generating the signature is separated from the function of extracting a portion. However, the signature generation server 3 may perform all the processes of generating the signature, storing, managing and extracting a portion; the information extraction server 5 is unnecessary in this case.

Subsequently, the extractor receives a generation completion notification of the original moving image information from the administrative manager of the video recording terminal 4 through some communication section and then starts a cutout process for the original moving image information. The action is taken when it is required for the original moving image information to be disclosed to a third party and when a preferable portion is extracted for disclosure. More specifically, it is expensive to disclose all the original moving image information since the amount of the original moving image information accumulated is enormous, a network shared server or the like with a large-capacity storage device needs to be installed, and other things may be preferable. Therefore, there may be a demand that a portion be cut out for disclosure or that a portion of the original moving image information be cut out because of privacy information included in part of the original moving image information. In such cases, the cutout process of the original moving image information occurs.

Figure 15:
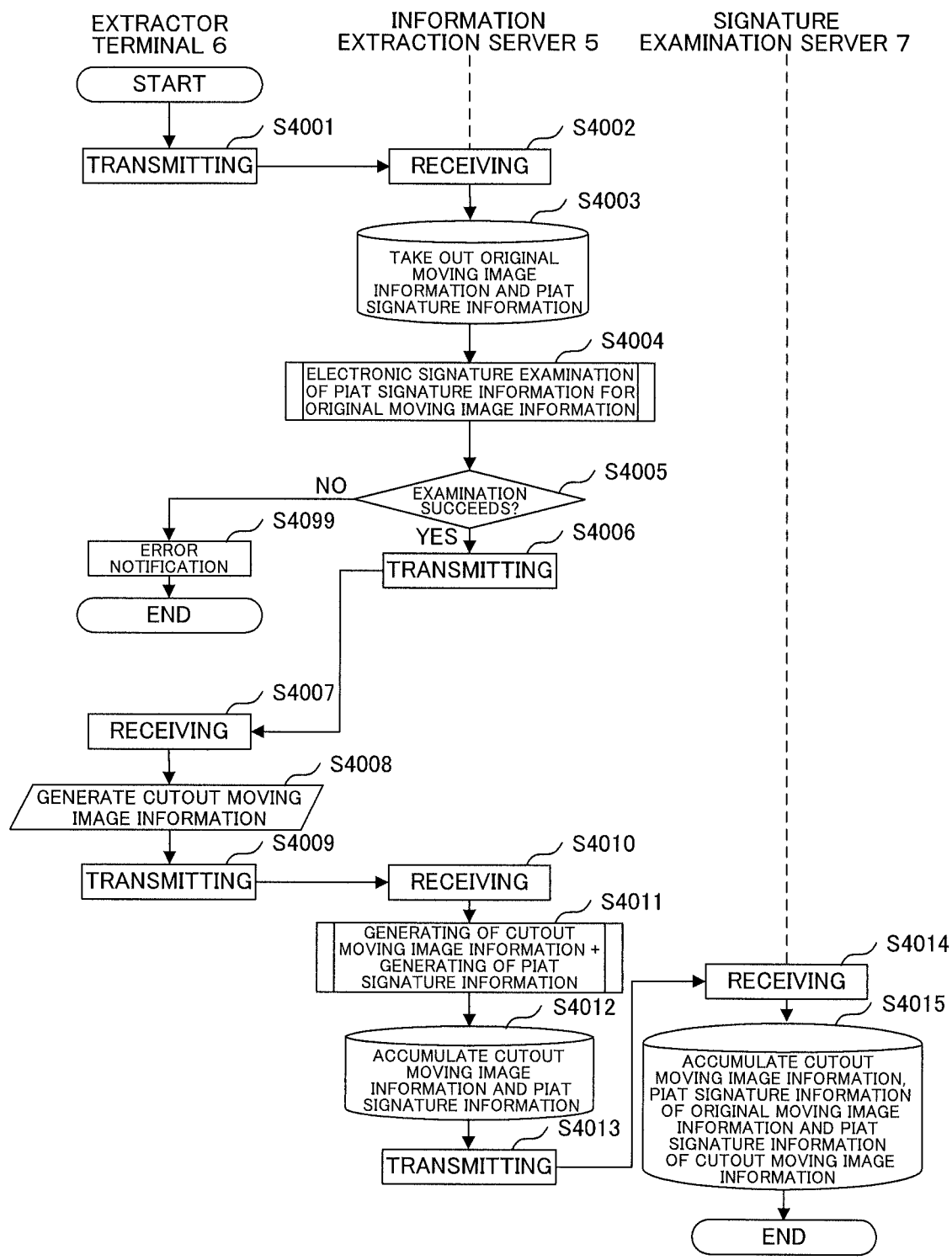
FIG. 15 is a flowchart illustrating an information extraction process according to an embodiment of the present invention.

As illustrated in FIG. 15, the extractor uses the extractor terminal 6 and transmits instructions to the information extraction server 5 to cut out the cutout-target original moving image information (S4001). The information extraction server 5 receives the instructions to cut out the cutout-target original moving image information (S4002). The information extraction server 5 takes out the cutout-target original moving image information and PIAT signature information accumulated in the document management DB 51 through the document management TB 52 of the information extraction server 5 (S4003) and examines the electronic signature attached to the PIAT signature information through the signature examination section 54 (S4004). When the information extraction server 5 fails to examine the electronic signature (S4005: NO), the information extraction server 5 judges that some kind of alteration has occurred and notifies the extractor accordingly (S4099). When the information extraction server 5 succeeds in examining the electronic signature (S4005: YES), a list of original moving image information is transmitted to the extractor terminal 6 (S4006). After the extractor terminal 6 receives the list of original moving image information (S4007), the list of original moving image information is displayed on a display device the extractor terminal 6 is equipped with. The extractor then selects the original moving image information from which the extractor cuts out; cuts out a preferable portion from the original moving image information; produces a cutout data item for each original data item including a cutout portion; and generates cutout moving image information (cutout stream data) consisting of the cutout data items (S4008).

Figure 22:
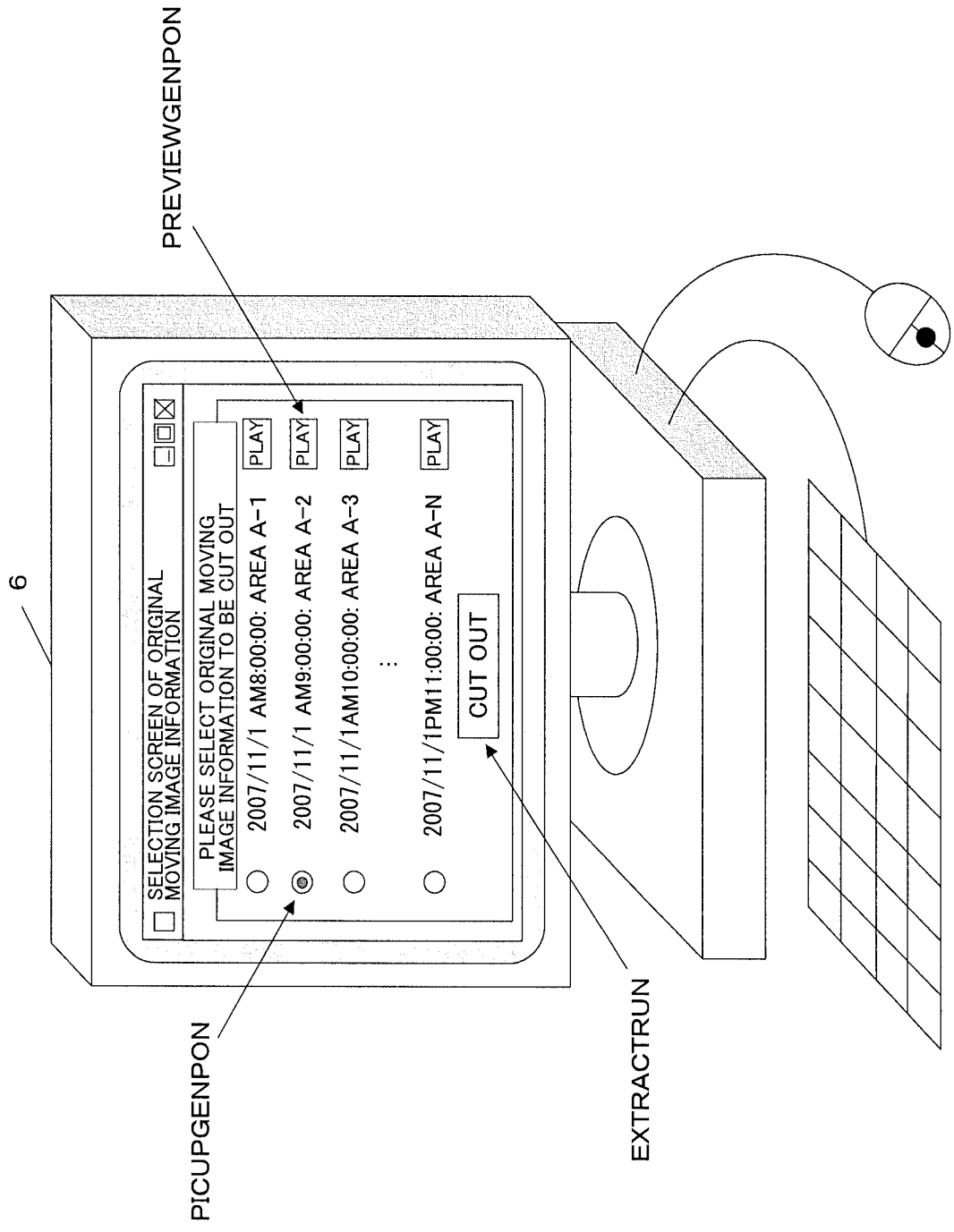
FIG. 22 is a diagram illustrating an operation of selecting original moving image information according to an embodiment of the present invention.
Figure 23:
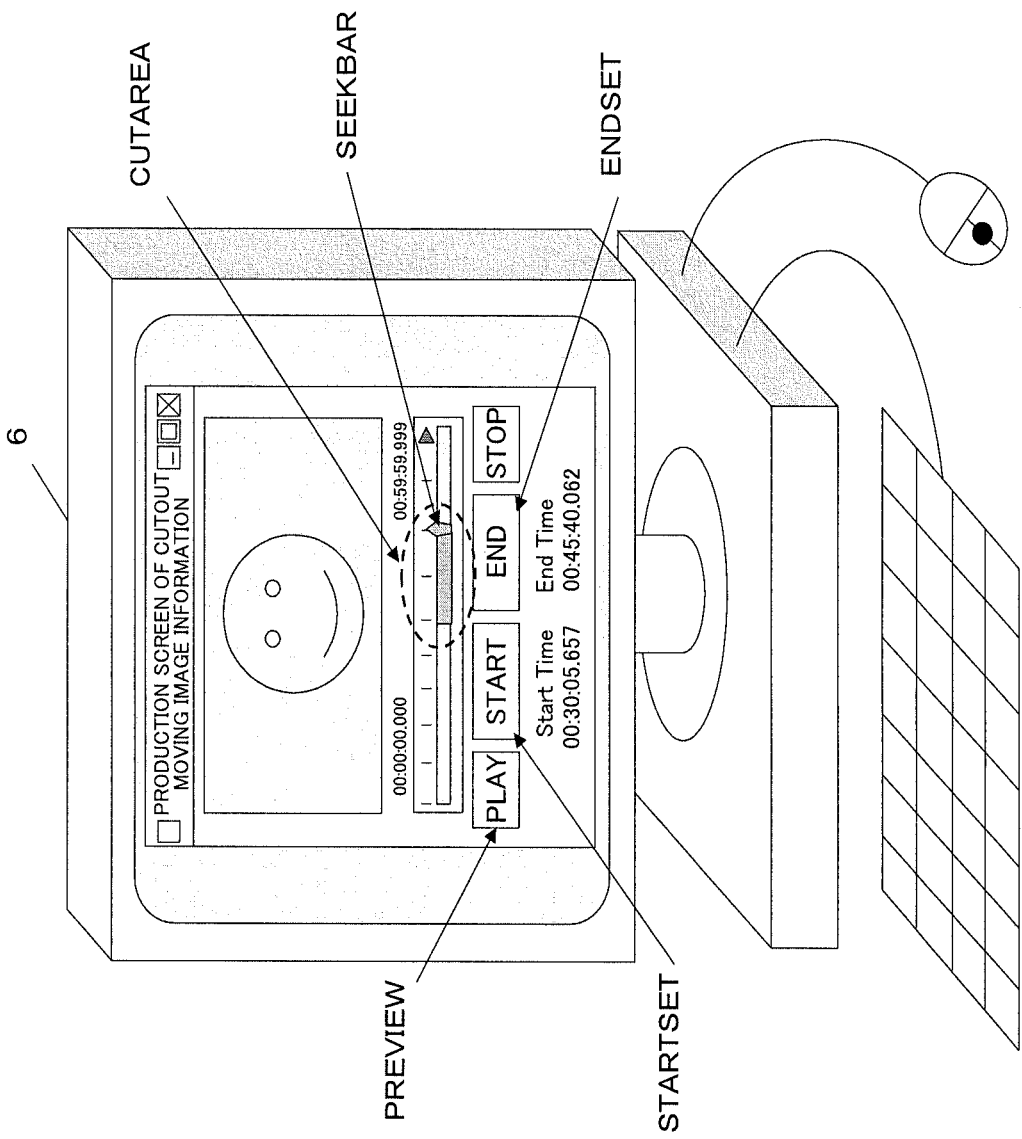
FIG. 23 is a diagram illustrating an operation of extracting original moving image information according to an embodiment of the present invention.

FIG. 22 illustrates an example of a selection operation by the extractor for the original moving image information. First, the list of the original moving image information accumulated in the document management DB 51 is displayed on an one-hour basis, enabling the extractor to select the original moving image information from which the extractor cuts out (PICUPGENPON). A simplified play tool is provided in order to search for a cutout portion. The pushing of a play button (PREVIEWGENPON) makes it possible to play a cutout portion for confirmation before the cutout process. In order to play, the specified original moving image information is acquired from the information extraction server 5 and plays. If the extractor has already known which portion is to be cot out, the operation is unnecessary. In this case, the extractor selects (PICUPGENPON) the original moving image information from which the extractor cuts out and pushes (EXTRACTRUN) a cutout button. After the cutout button is pushed, the information extraction server 5 acquires the selected original moving image information to generate the cutout moving image information. FIG. 23 illustrates an example of an extraction operation by the extractor for the original moving image information.

Thanks to the play button (PREVIEW), the extractor may visually check to cut out by specifying a range from which a preferable portion is cut out while the cutout moving image information is being played. One way to cut out is to use and operate a seek bar (SEEKBAR) until the seek bar reaches a starting position for cutting out; push a start button (STARTSET) at the time when the seek bar is at the position to set a cutout start position; simply use and operate the seek bar (SEEKBAR) until the seek bar reaches an ending position for cutting out; and push an end button (ENDSET) at the time when the seek bar is at the position to set a cutout end position. Thanks to the operation, a cutout range (CUTAREA) is set. Therefore, the extractor then selects a generation menu of the cutout moving image information and generates the cutout moving image information.

Figure 18:
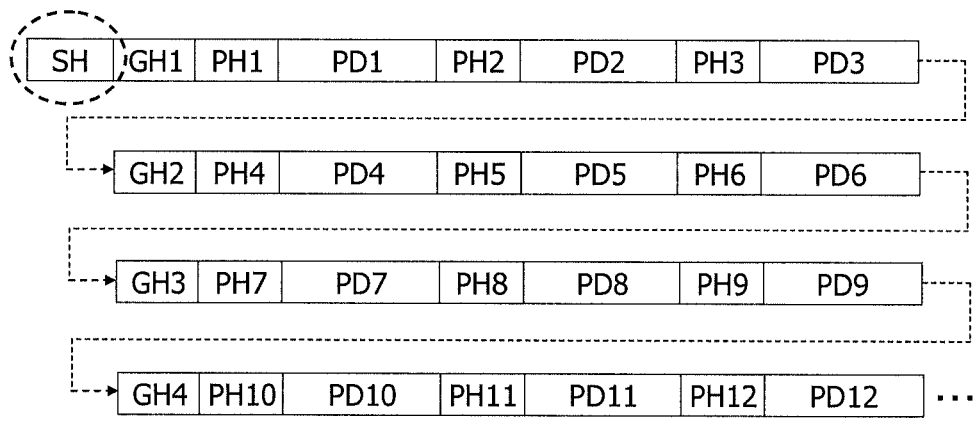
FIG. 18 is a diagram illustrating an example of a frame structure when a sequence header is not added according to an embodiment of the present invention.

In the example of the frame structure of MPEG1 illustrated in FIG. 11, the SH is attached to the heads of all the GOPs. However, it is unnecessary to attach the SH to each GOP. Therefore, when each GOP is observed, the SH may be attached to the top GOP (GH1); there may be a frame structure in which the SH is not attached to the subsequent GOP. FIG. 18 illustrates an example of the frame structure thereof.

When the GOP starts with the SH, it is possible to recognize the start of the GOP by detecting the SH. Even if the GOP starts with the GH because no SH is attached to the GOP, it is possible to recognize the start of the GOP by detecting the GH. However, there is some problem about applying the technique to the MPEG1 with the frame structure illustrated in FIG. 18 when a portion is cut out for privacy protection. That is, when the frame structure illustrated in FIG. 18 is used, it may be impossible to play the cutout moving image if the moving image is cut out at GH2, GH3 or GH4. The problem occurs because there is a rule under the MPEG1 standard that the top GOP (GH1) of streaming data must include the SH to guarantee a play operation.

The following steps are taken to avoid the situation in which the cutout moving image may not play as described above.

Figure 24:
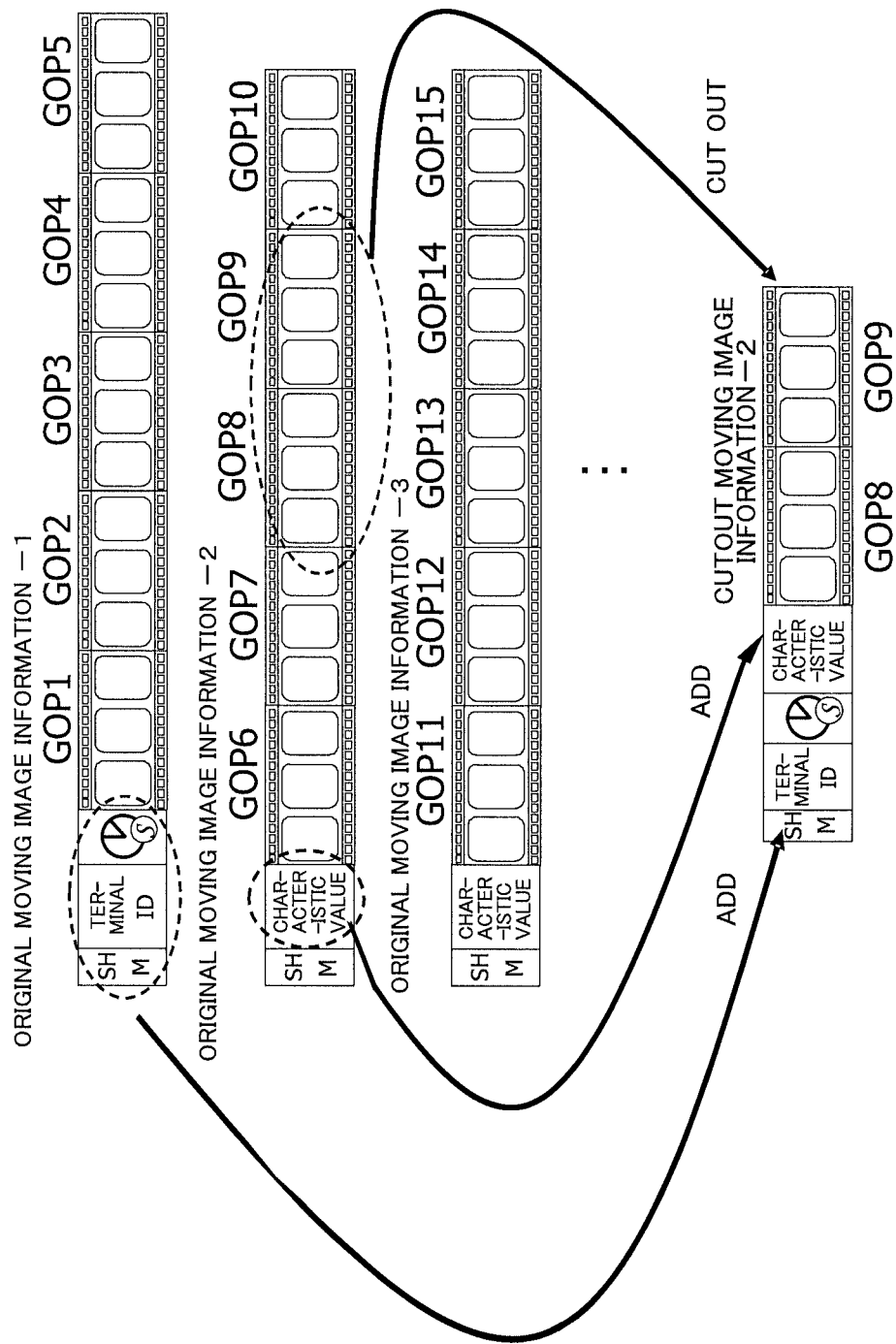
FIG. 24 is a diagram illustrating a generation method of cutout moving image information-2 according to an embodiment of the present invention.
Figure 25:
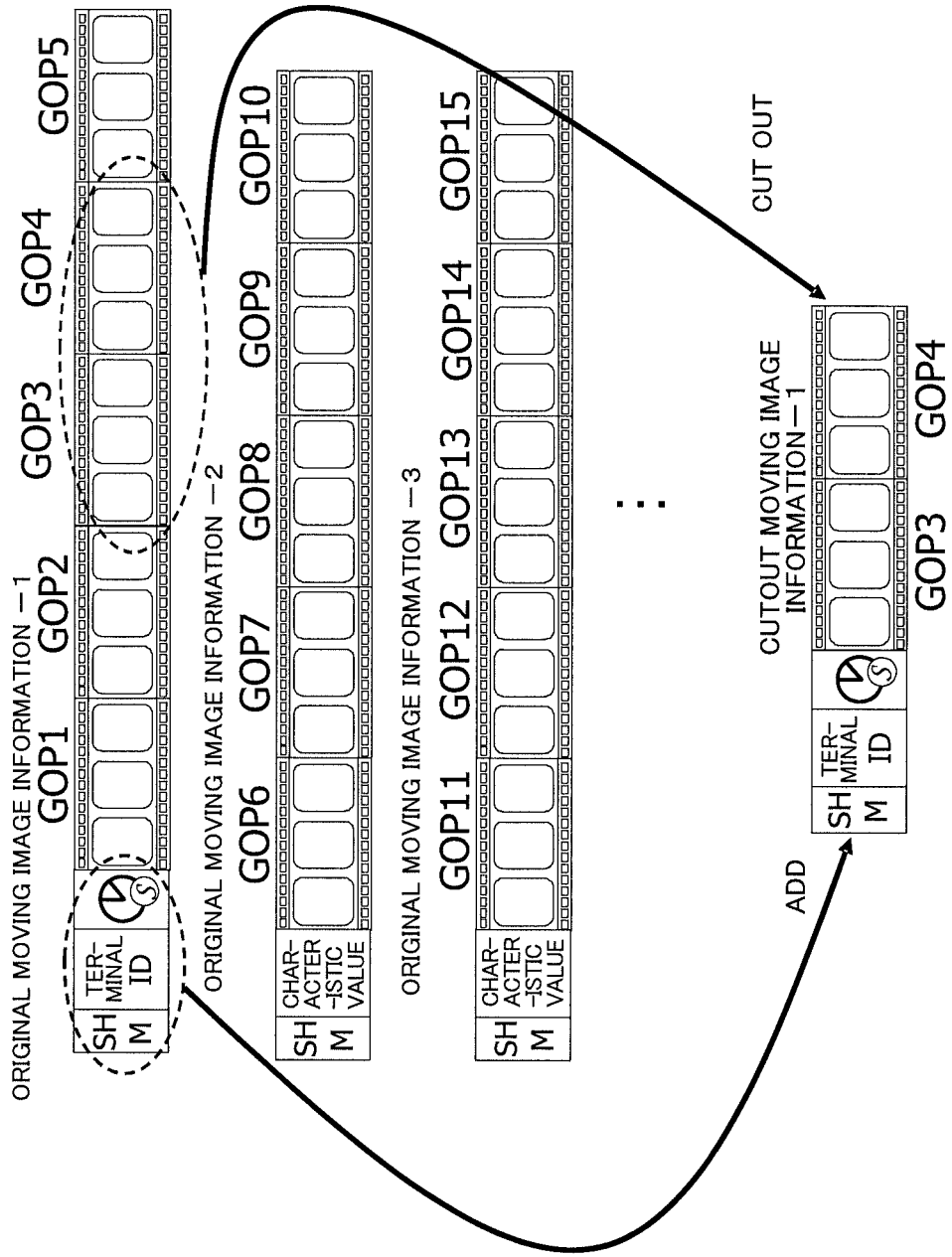
FIG. 25 is a diagram illustrating a generation method of cutout moving image information-1 according to an embodiment of the present invention.
Figure 26:
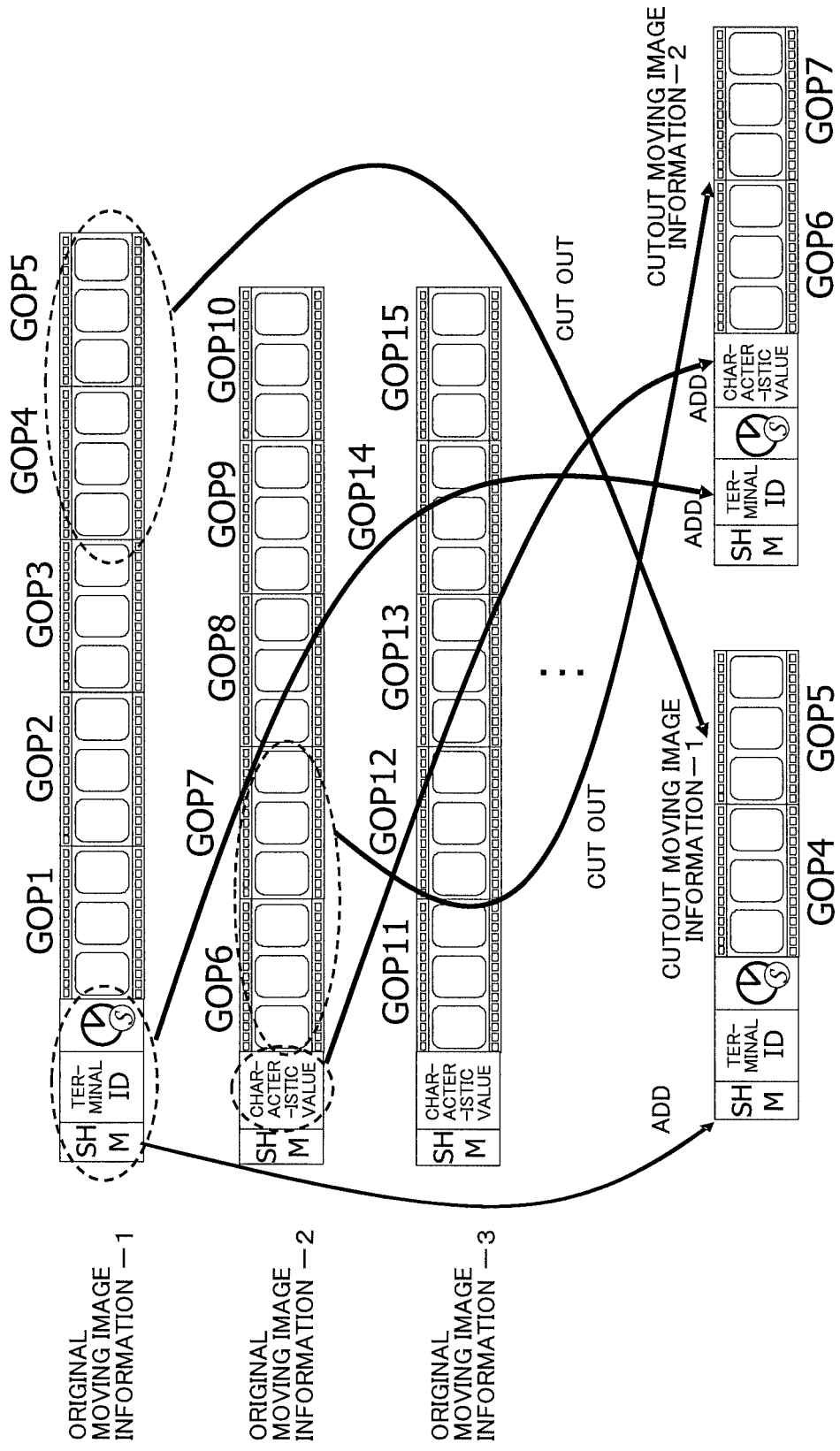
FIG. 26 is a diagram illustrating a generation method of cutout moving image information that stretches across a plurality of pieces of original moving image information according to an embodiment of the present invention.

First, there may be two cutout methods: a method of cutting out a portion from each piece of original moving image information in such a way that the portion does not stretch across a plurality of pieces of original moving image information (a method of cutting out one hour or less worth of original moving image information), and a method of cutting out a portion in such a way that the portion stretches across a plurality of pieces of original moving image information (a method of cutting out one hour or more worth of original moving image information). As for the former method of cutting out one hour or less worth of original moving image information, there are different methods of generating the hash information for the cutting out of the original moving image information-2 and the subsequent original moving image information and for the cutting out of the original moving image information-1. FIGS. 24 and 25 illustrate a cutout method for one hour or less worth of original moving image information; FIG. 26 illustrates an example of three cutout methods for one hour or more worth of original moving image information. Based on FIGS. 24, 25 and 26, the generation process of the cutout moving image information and the generation process of the PIAT signature information will be described in detail.

First, the cutout method for one hour or less worth of the original moving image information-2 will be described. FIG. 24 illustrates an example in which a middle portion (GOP8 and GOP9) of the original moving image information-2 is cut out. First, the cutout moving image information is generated by adding the SH including the terminal ID stored in the original moving image information-1, the date-and-time information and the characteristic value of the last GOP information of the preceding original moving image information. At this time, the added SH is added to the actual body of the cutout moving image information, thereby avoiding the situation in which the moving image may not be played. FIG. 24 illustrates an example in which a portion extending from GOP8, which serves as the top, to GOP9 is cut out. However, if the SH is added to the top GOP, it is possible to play the cutout moving image information. Therefore, in order to reduce the amount of data of the cutout moving image information, it is unnecessary to add the SH to GOP9.

Figure 27:
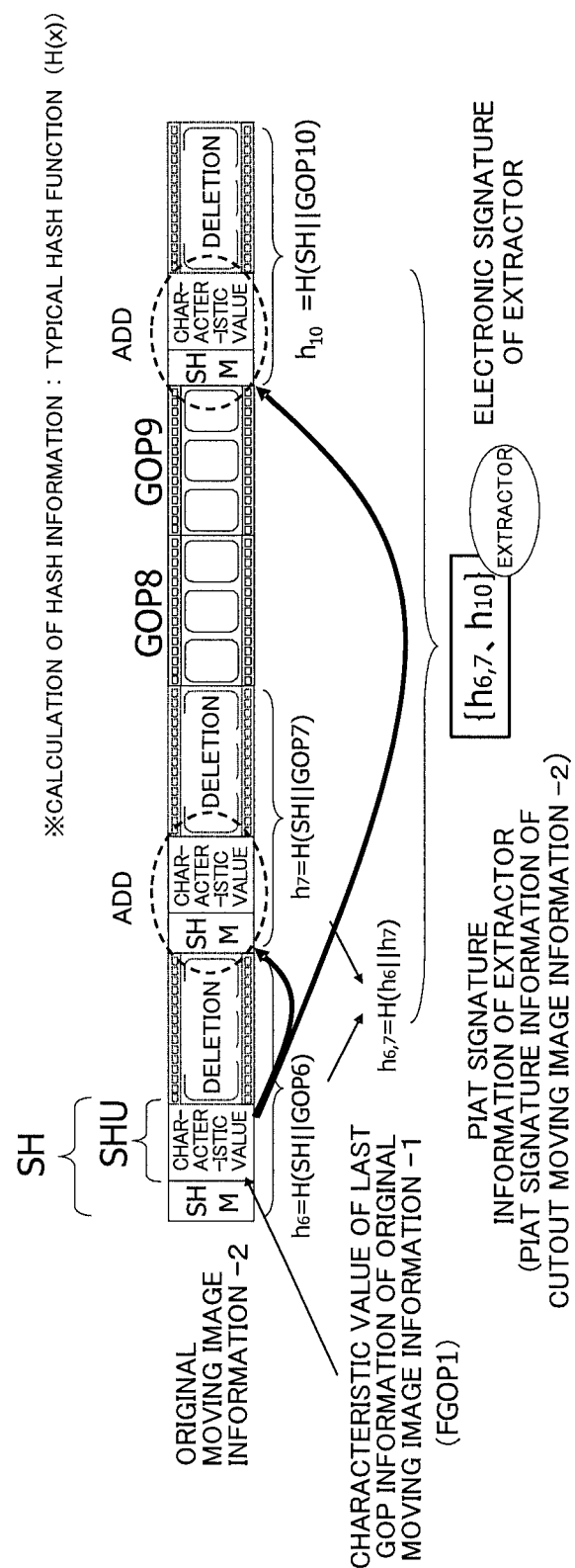
FIG. 27 is a diagram illustrating a signature generation method of cutout moving image information-2 according to an embodiment of the present invention.

After the cutout moving image information is generated, the extractor terminal 6 transmits the generated cutout moving image information to the information extraction server 5 (S4009). After receiving the cutout moving image information (S4010), the signature generation section 53 of the information extraction server 5 generates the PIAT signature information for the cutout moving image information. More specifically, the signature generation section 53 generates a plurality of pieces of root hash information (referred to as a deletion root hash information list, hereinafter) consisting only of GOPs that are removed during extraction. At this time, in a similar way to when the FIAT signature information for the original moving image information is generated, the information extraction server 5 generates the deletion root hash information list including the SH by adding the contents of the most recent SH to the GOP to which the SH is not added in a deletion portion. FIG. 27 illustrates the generation method thereof. The adding of the SH is not recorded in the actual body of the original moving image information; the adding of the SH means that the SH is added, for example, on the storage area (memory or the like) when the hash information is generated. At this time, the hash information is generated by adding the contents of the SH including the characteristic value (FGOP1) of the last GOP information of the original moving image information-1 that is stored in the SHU. Moreover, the information extraction server 5 generates the electronic signature of the extractor for the generated deletion root hash information list and regards the deletion root hash information list and the electronic signature collectively as the PIAT signature information of the extractor (S4011).

FIG. 25 illustrates an example in which a middle portion (GOP3 and GOP4) of the original moving image information-1 is cut out. In the original moving image information-1, unlike the original moving image information-2 and the subsequent original moving image information, the characteristic value of the last GOP information of the preceding original moving image information is not included in the SH. Accordingly, in the process of cutting out from the original moving image information-1, the cutout moving image information is generated by adding the SH including the terminal ID stored in the original moving image information-1 and the date-and-time information. At this time, the added SH is added to the actual body of the cutout moving image information, thereby avoiding the situation in which the moving image may not be played. Similarly, FIG. 25 illustrates an example in which a portion extending from GOP3, which serves as the top, to GOP4 is cut out. However, if the SH is added to the top GOP, it is possible to play the cutout moving image information. Therefore, in order to reduce the amount of data of the cutout moving image information, it is unnecessary to add the SH to GOP4.

Figure 28:
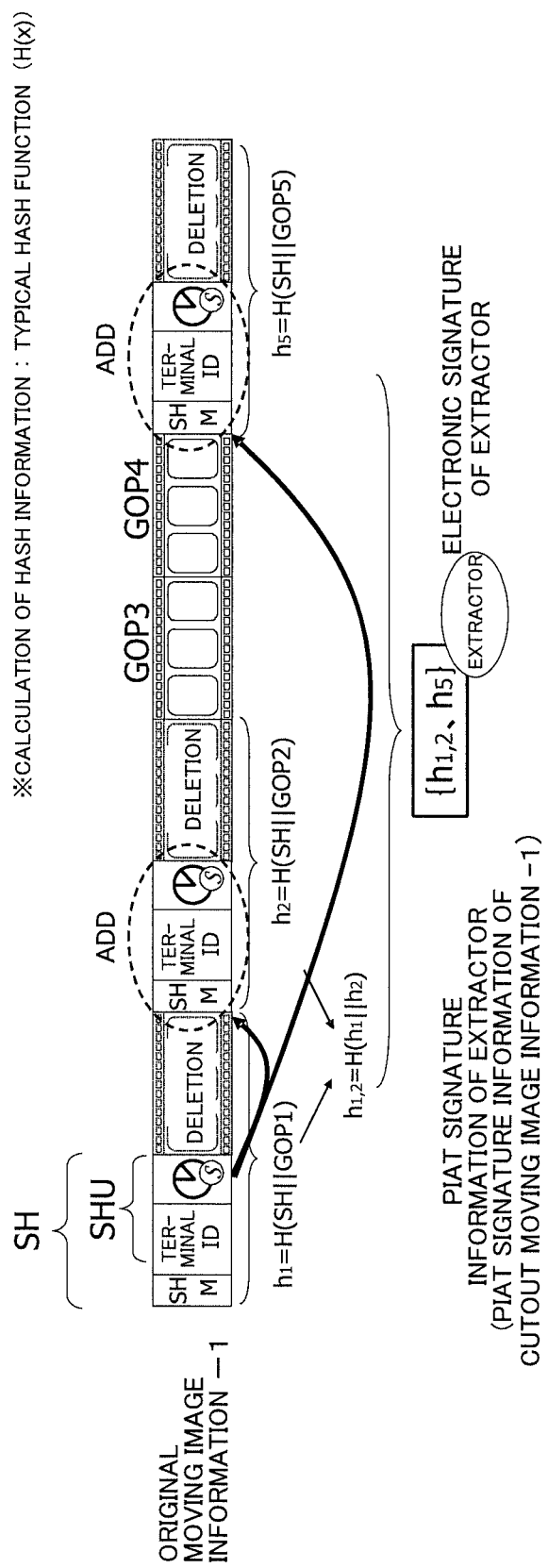
FIG. 28 is a diagram illustrating a signature generation method of cutout moving image information-1 according to an embodiment of the present invention.

The following additional description is about the flow of how to generate the PIAT signature information for the cutout moving image information in the case of FIG. 25. Similarly, when generating the deletion root hash information list, the information extraction server 5 generates the deletion root hash information list including the SH by adding the contents of the most recent SH to the GOP to which the SH is not added in a deletion portion. FIG. 28 illustrates the generation method thereof. The adding of the SH is not recorded in the actual body of the original moving image information; the adding of the SH means that the SH is added, for example, on the storage area (memory or the like) when the hash information is generated. At this time, the hash information is generated by adding the contents of the SH including the terminal ID stored in the SHU and the date-and-time information to which the electronic signature of the time delivery organization is attached. Moreover, the information extraction server 5 generates the electronic signature of the extractor for the generated deletion root hash information list and regards the deletion root hash information list and the electronic signature collectively as the PIAT signature information of the extractor (S4011).

Figure 29:
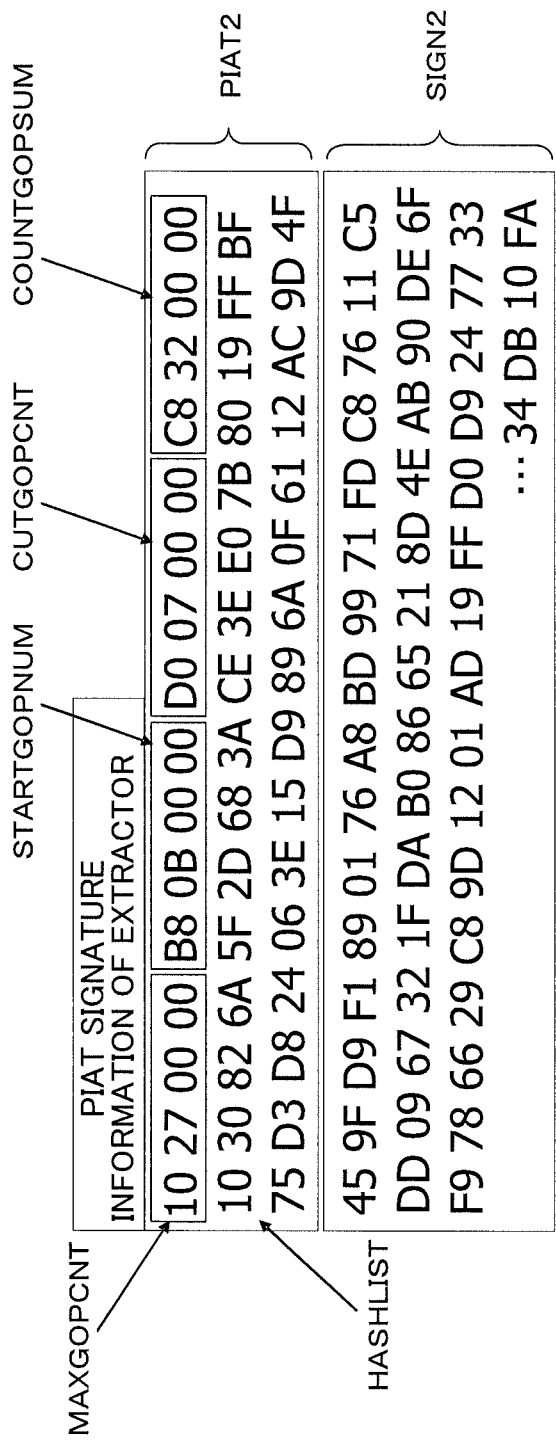
FIG. 29 is a diagram illustrating the contents of PIAT signature information of an extractor according to an embodiment of the present invention.

FIG. 29 illustrates the contents of the PIAT signature information of the extractor. In the example here, as the examination information for the cutout moving image information, the following items of information are recorded in the following order (PIAT2): the total number of GOPs of original moving image information that serves as a foundation (MAX- GOPCNT), a GOP number of a cutout start position (START-GOPNUM), the number of GOPs cut out (CUTGOPCNT), number-of-GOPs sum information indicating what number GOP the top GOP of the cutout moving image information is from the start of the original moving image information (COUNTGOPSUM), and the deletion root hash information list (HASHLIST). SIGN2 represents the electronic signature of the extractor for the examination information. According to the present embodiment, the examination information for the cutout moving image information and the electronic signature of the extractor are put together before being recorded as the PIAT signature information. However, the examination information for the cutout moving image information and the electronic signature may be recorded and managed separately.

After the PIAT signature information of the cutout moving image information is generated, the information extraction server 5 accumulates the cutout moving image information and the PIAT signature information in pairs in the document management DB 51 through the document management TB 52 of the information extraction server 5 (S4012). Subsequently, the information extraction server 5 transmits three kinds of information, the cutout moving image information, the FIAT signature information of the original moving image information and the PIAT signature information of the cutout moving image information, to the signature examination server 7 through the communication section 55 (S4013). The signature examination server 7 receives the three kinds of information, the cutout moving image information, the PIAT signature information of the original moving image information and the PIAT signature information of the cutout moving image information, through the communication section 74 (S4014) and accumulates the three kinds of information, the cutout moving image information, the PIAT signature information of the original moving image information and the PIAT signature information of the cutout moving image information, in the document management DB 71 through the document management TB 72 of the signature examination server 7 (S4015).

The following describes the cutout method for one hour or more worth of original moving image information. FIG. 26 illustrates an example in which a portion extending from a final portion (GOP4 and GOP5) of the original moving image information-1 to an opening portion (GOP6 and GOP7) of the original moving image information-2 is extracted.

When a plurality of pieces of original moving image information, which stretches into the next one hour worth of original moving image information, is cut out as mentioned above, the generating of the cutout moving image information is similarly performed: cutout moving image information-1 and cutout moving image information-2, which are cutout data items corresponding to the original moving image information-1 and the original moving image information-2, are generated by adding the SH including the terminal ID stored in the original moving image information-1, the date-and-time information, and the characteristic value of the last GOP information of the preceding original moving image information. At this time, the added SH is added to the actual body of the cutout moving image information, thereby avoiding the situation in which the moving image may not be played. FIG. 26 illustrates an example in which a portion extending from GOP4, which serves as the top, to GOP5 is cut out as well as an example in which a portion extending from GOP6, which serves as the top, to GOP7 is cut out. However, if the SH is added to the top GOP, it is possible to play the cutout moving image information. Therefore, in order to reduce the amount of data of the cutout moving image information, it is unnecessary to add the SH to GOP5 and GOP7.

Figure 30:
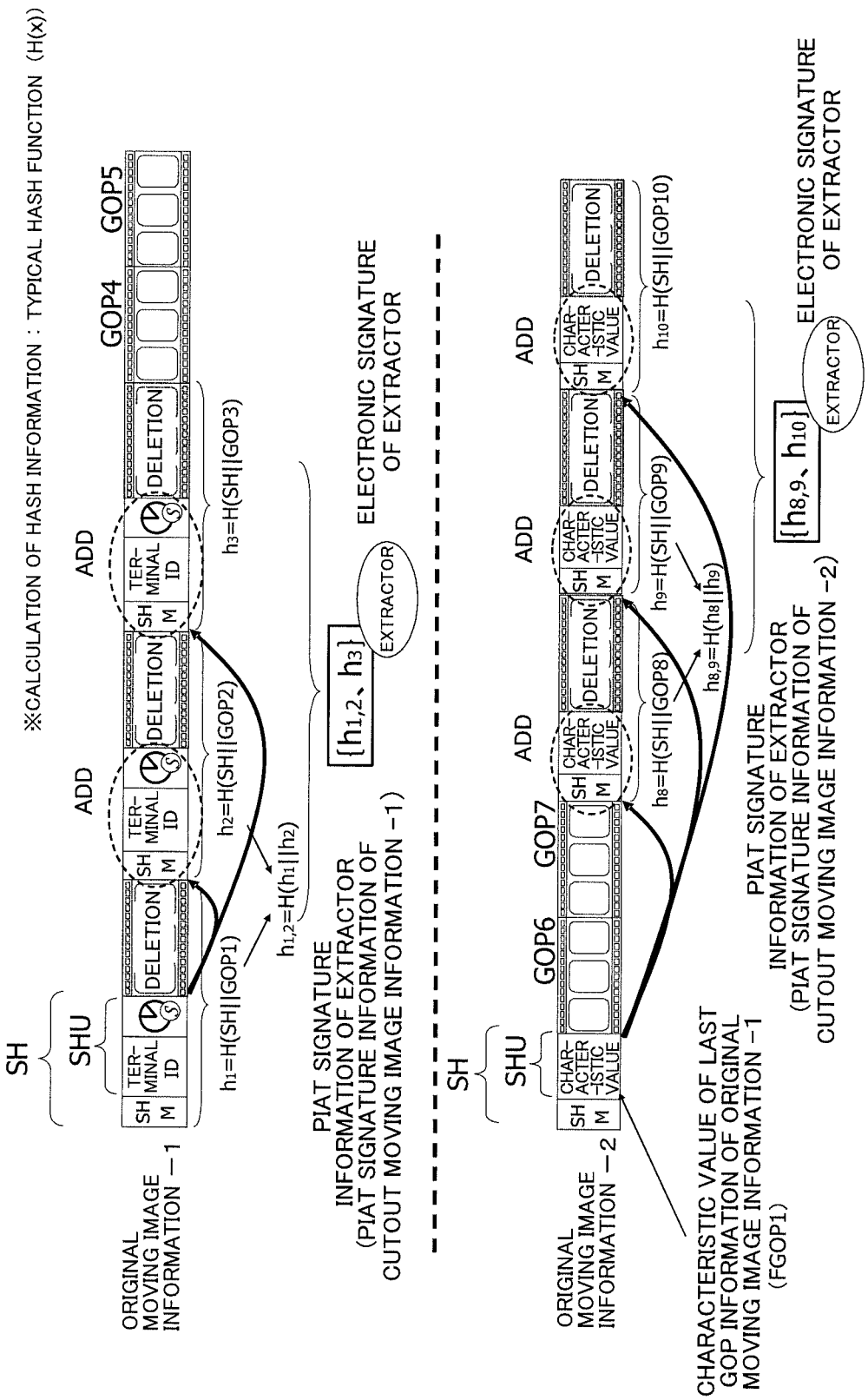
FIG. 30 is a diagram illustrating a signature generation method of cutout moving image information that stretches across a plurality of pieces of original moving image information according to an embodiment of the present invention.

Then, in the process of generating the PIAT signature information for the cutout moving image information, with the use of the methods illustrated above with reference to FIGS. 27 and 28, the PIAT signature information of the cutout moving image information is generated for the original moving image information-1 and another for the original moving image information-2. Accordingly, what is used here is a method of generating the FIAT signature information for the cutout moving image information for each piece of original moving image information. FIG. 30 illustrates the generation method thereof: the upper part depicts the signature generation method for the cutout moving image information-1, while the lower part depicts the signature generation method for the cutout moving image information-2.

After the PIAT signature information of the cutout moving image information is generated, the information extraction server 5 accumulates the cutout moving image information-1 and the cutout moving image information-2 and each pair of pieces of PIAT signature information for both the cutout moving image information-1 and the cutout moving image information-2 in the document management DB 51 through the document management TB 52 of the information extraction server 5 (S4012). Subsequently, the information extraction server 5 transmits six kinds of information, the cutout moving image information-1, the PIAT signature information of the original moving image information-1, the PIAT signature information of the cutout moving image information-1, the cutout moving image information-2, the PIAT signature information of the original moving image information-2, and the PIAT signature information of the cutout moving image information-2, to the signature examination server 7 through the communication section 55 (S4013). The signature examination server 7 receives the six kinds of information through the communication section 74 (S4014) and accumulates the six kinds of information in the document management DB 71 through the document management TB 72 of the signature examination server 7 (S4015).

Subsequently, the examiner receives a disclosure notification of the cutout moving image information from the extractor through some communication section and then starts a process of confirming and examining the disclosed cutout moving image information.

Figure 16:
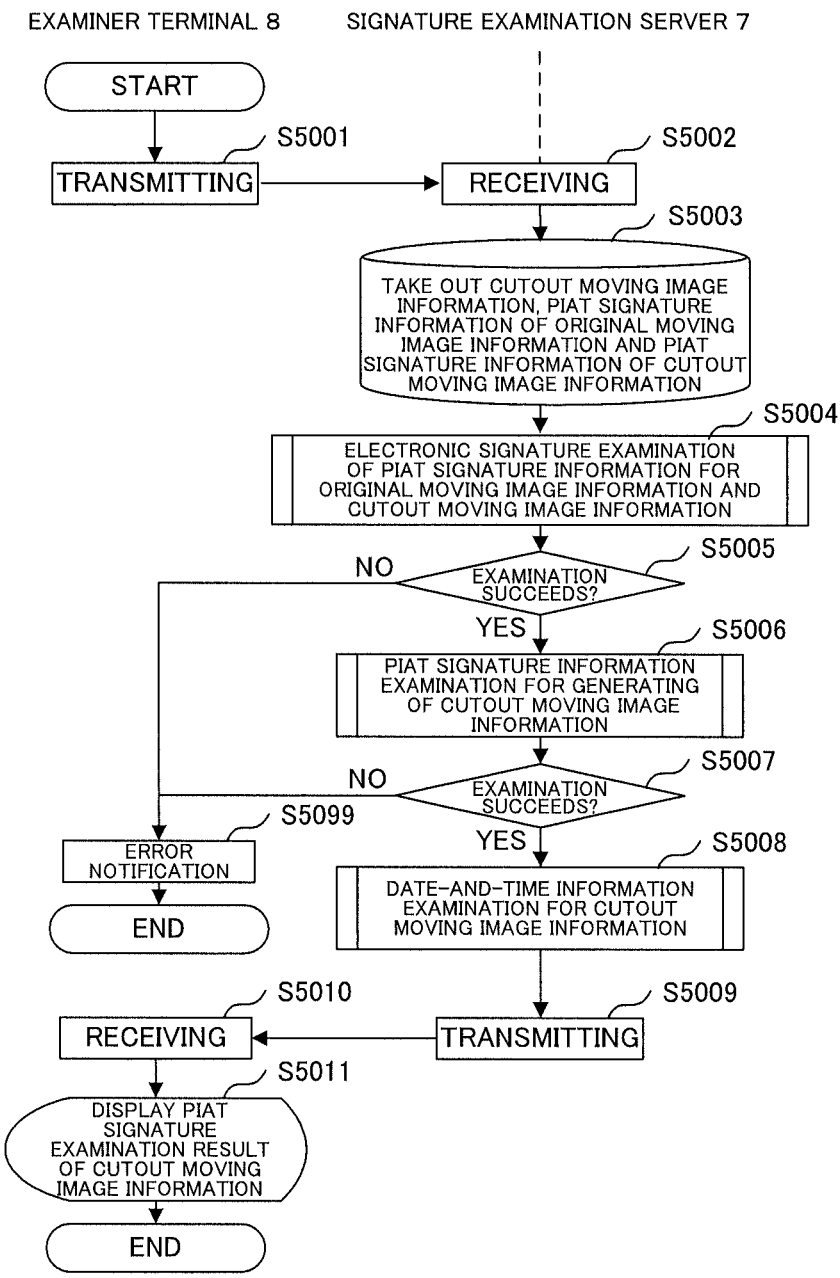
FIG. 16 is a flowchart illustrating a signature examination process according to an embodiment of the present invention.
Figure 31:
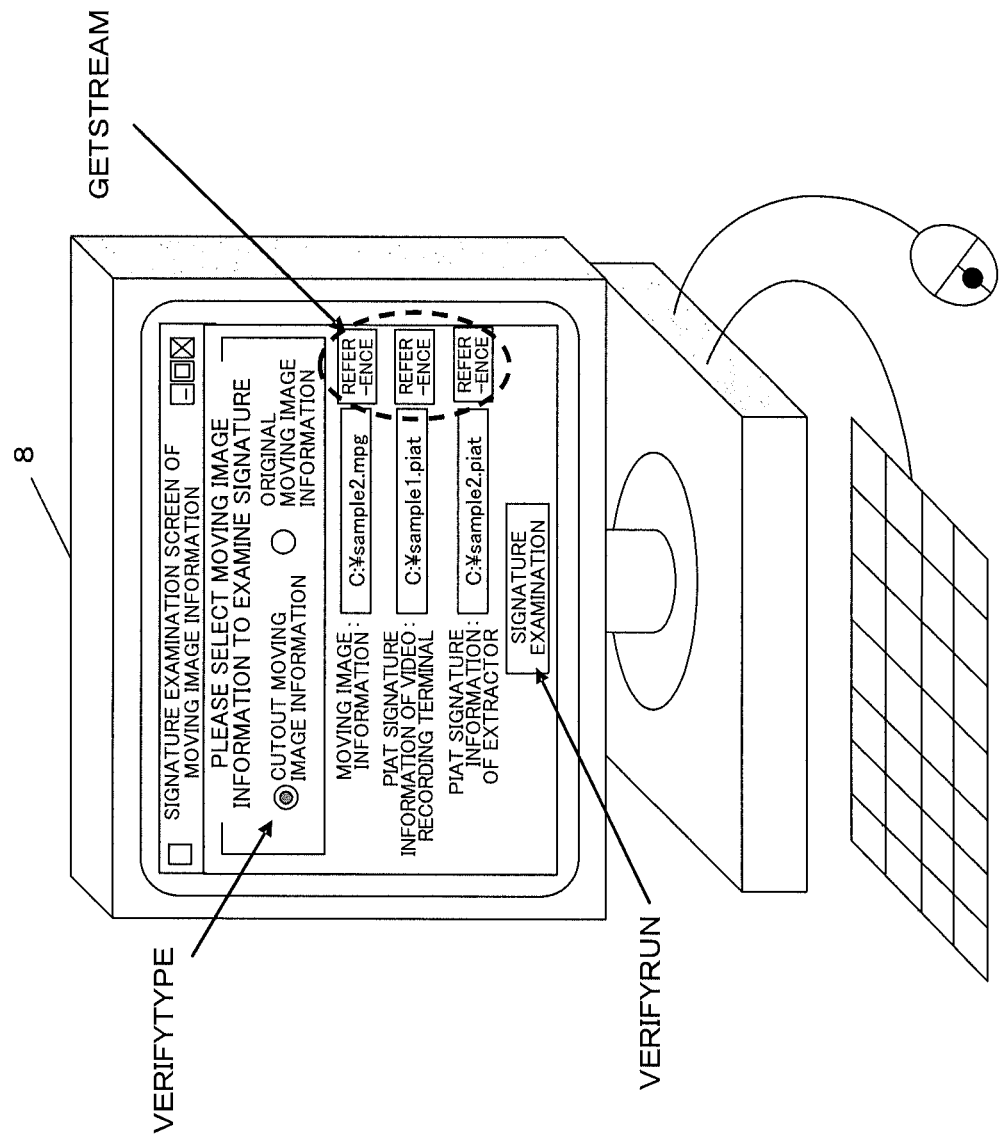
FIG. 31 is a diagram illustrating a selection screen of examination-target moving image information and examination information according to an embodiment of the present invention.

As illustrated in FIG. 16, the examiner uses the examiner terminal 8 to transmit instructions to the signature examination server 7 to take out the examination-target cutout moving image information (S5001). FIG. 31 illustrates an example of the examination-target moving image information and a selection screen for the PIAT signature information (examination information). In the example here, in the process of examining the signature, it is possible to select the cutout moving image information and the original moving image information and to examine each piece of moving image information (VERIFYTYPE). For example, if the cutout moving image information is selected by VERIFYTYPE, then it becomes possible to select the cutout moving image information, the FIAT signature information of the video recording terminal 4, and the PIAT signature information of the extractor. By pushing a reference button of each field (GETSTREAM), each piece of information may be selected on Explorer. Moreover, by pushing the reference button, it is possible to make reference to or select the cutout moving image information accumulated in the document management DB 71 of the signature examination server 7. Finally, by pushing a signature examination button (VERIFYRUN), the signature examination process starts for the selected cutout moving image information.

According to the present embodiment, the examiner is supposed to select the PIAT signature information of the video recording terminal 4 and the PIAT signature information of the extractor. Instead, the examiner may select only the cutout moving image information without regard to the presence of the PIAT signature information (examination information). For example, the following method is also possible: titles are added so that it is possible to easily guess or identify what the contents of the cutout moving image information are, and the examiner is allowed to see a list of the titles and select from the list. In this case, such measures as retaining link information are preferable for identifying which piece of moving image information is selected from among those accumulated in the document management DB 71 of the signature examination server 7 when the piece of moving image information is selected from the list.

FIG. 31 illustrates a screen that is displayed when the examination process is performed in association with the disclosure of one hour or less worth of cutout moving image information. However, in the case of a plurality of pieces of cutout moving image information that stretches into the next one hour worth of original moving image information, two kinds of moving image information need to be selected. Even in this case, there may be a method that allows the examiner to select only the cutout moving image information without regard to the fact that the moving image information and the PIAT signature information are divided into a plurality of pieces.

After the signature examination process starts, the signature examination server 7 receives instructions to take out the examination-target cutout moving image information (S5002). First, the signature examination process for one hour or less worth of cutout moving image information will be described. The signature examination server 7 takes out the three kinds of information accumulated in the document management DB 71, the cutout moving image information, the PIAT signature information of the original moving image information and the PIAT signature information of the cutout moving image information, through the document management TB 72 of the signature examination server 7 (S5003). If the original moving image information-2 is cut out and disclosed, the signature examination server 7 takes out the following three kinds of information: the cutout moving image information-2, the PIAT signature information of the original moving image information-2 and the PIAT signature information of the cutout moving image information-2. If the original moving image information-1 is cut out and disclosed, the signature examination server 7 takes out the following three kinds of information: the cutout moving image information-1, the PIAT signature information of the original moving image information-1 and the PIAT signature information of the cutout moving image information-1. The signature examination server 7 then examines the electronic signature attached to the PIAT signature information through the signature examination section 73 (S5004). When the signature examination server 7 fails to examine the electronic signature (S5005: NO), the signature examination server 7 judges that some kind of alteration has occurred and notifies the examiner accordingly (S5099).

Figure 32:
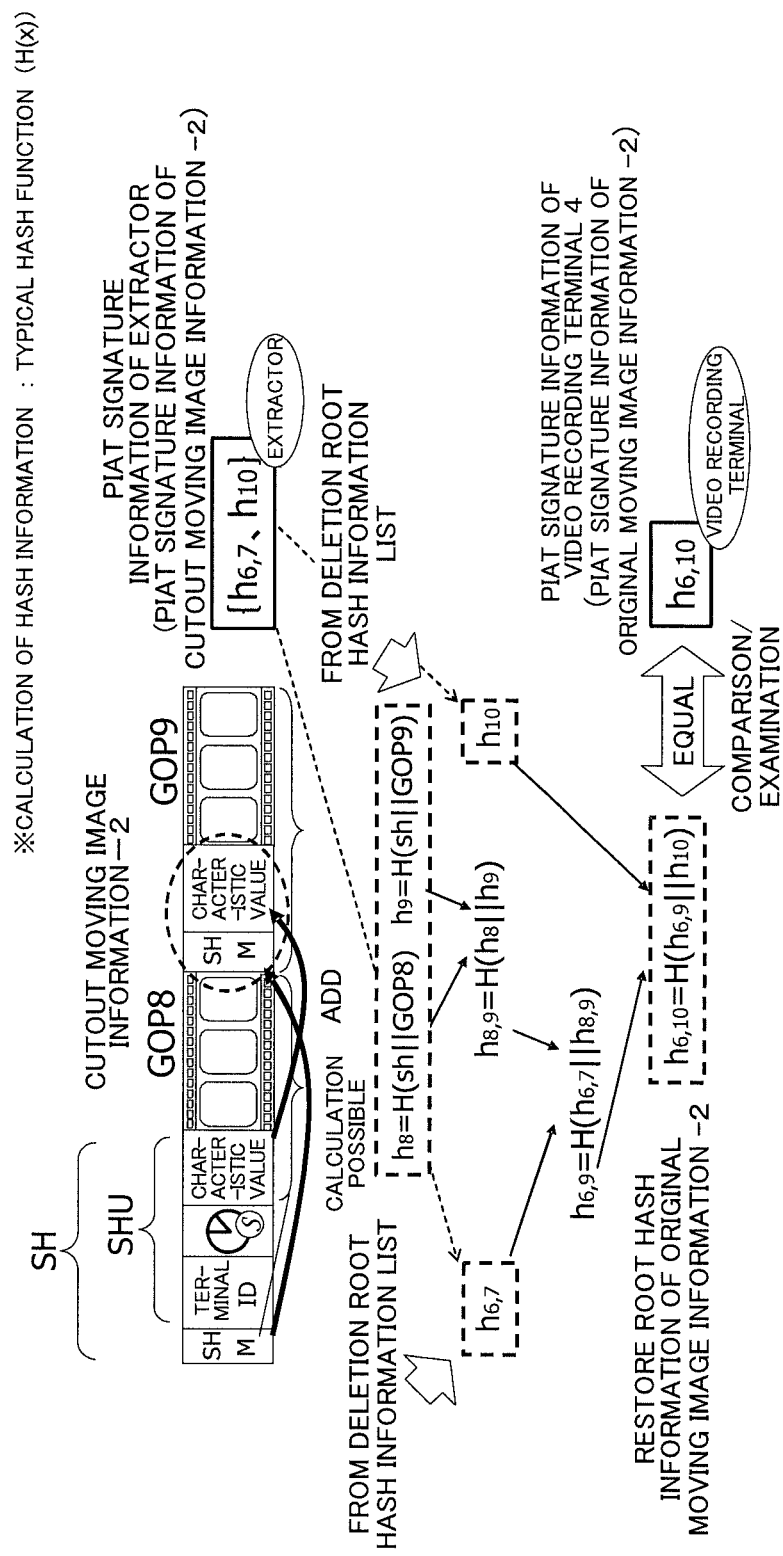
FIG. 32 is a diagram illustrating a signature examination method of cutout moving image information-2 according to an embodiment of the present invention.
Figure 33:
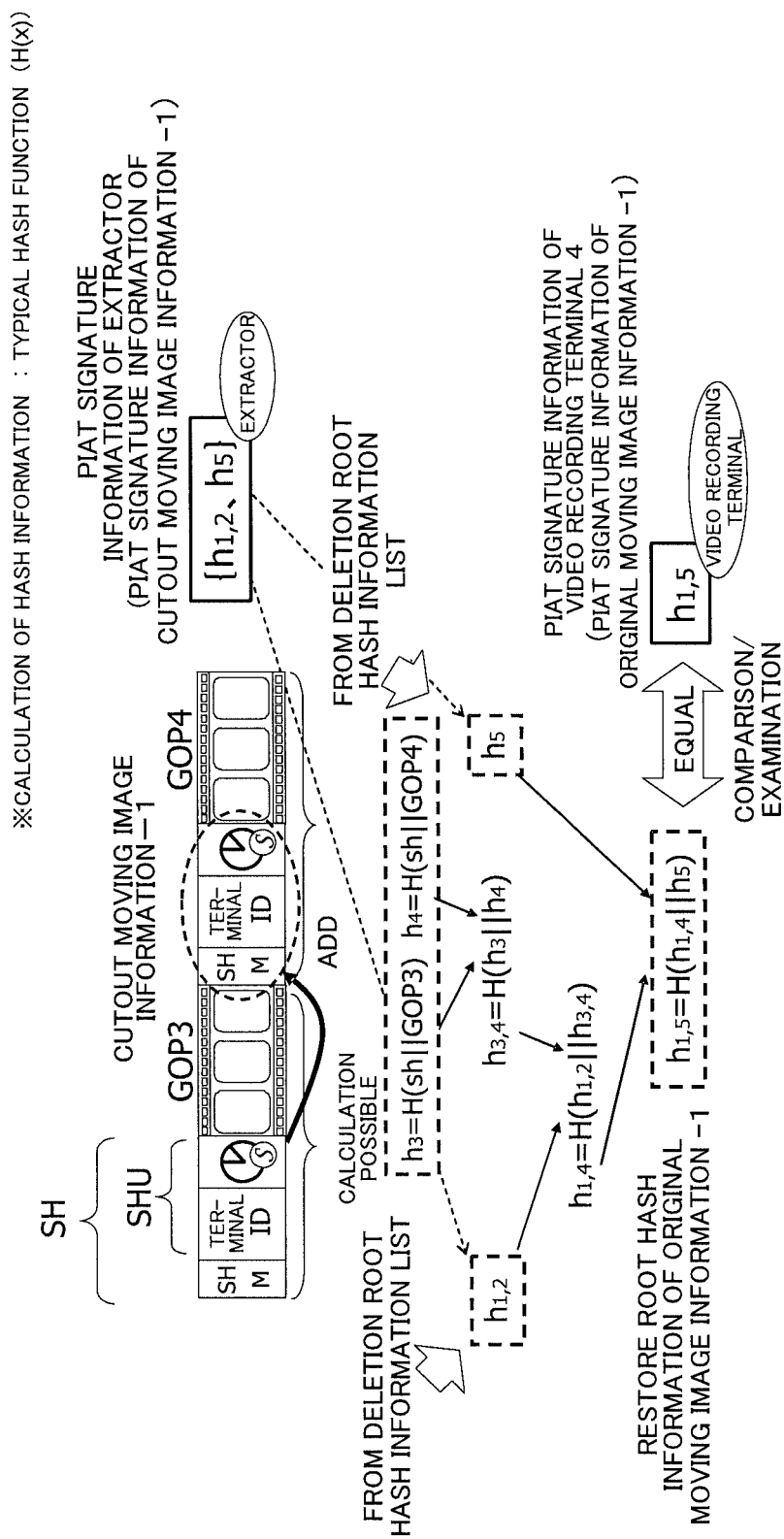
FIG. 33 is a diagram illustrating a signature examination method of cutout moving image information-1 according to an embodiment of the present invention.

When the signature examination server 7 succeeds in examining the electronic signature (S5005: YES), the signature examination server 7 then examines the PIAT signature information for the cutout moving image information (S5006). FIGS. 32 and 33 illustrate the examination methods of the PIAT signature information for one hour or less worth of cutout moving image information. At this time, if two consecutive pieces of partial information of GOP are cut out as illustrated in FIGS. 24 and 25, the examination process of the PIAT signature information for the cutout moving image information fails when the hash information is generated with the SHs not included in the second and subsequent GOPs because it is unnecessary to add the SHs to the second and subsequent GOPs. Therefore, even when the examination process of the PIAT signature information of the cutout moving image information is performed, the contents of the most recent SH are similarly added to the GOP to which the SH is not added, and the hash information is so generated as to include the SH.

In FIG. 32, the hash information is generated by adding the SH that does not have the terminal ID in the SHU and the date-and-time information but includes the characteristic value of the last GOP information of the preceding original moving image information. In FIG. 33, the hash information is generated by adding the SH including the terminal ID in the SHU and the date-and-time information.

Subsequently, the root hash information of the original moving image information, as well as the deletion root hash information list included in the PIAT signature information of the extractor (the PIAT signature information of the cutout moving image information), is restored to be examined and compared with the PIAT signature information of the video recording terminal 4 (the FIAT signature information of the original moving image information).

Similarly, even for the signature examination of one hour or more worth of cutout moving image information, the signature examination server 7 takes out six kids of information accumulated in the document management DB 71, the cutout moving image information-1, the PIAT signature information of the original moving image information-1, the PIAT signature information of the cutout moving image information-1, the cutout moving image information-2, the PIAT signature information of the original moving image information-2 and the PIAT signature information of the cutout moving image information-2 (S5003). First, the signature examination server 7 examines the electronic signature attached to the PIAT signature information through the signature examination section 73 (S5004). When the signature examination server 7 fails to examine the electronic signature (S5005: NO), the signature examination server 7 judges that some kind of alteration has occurred and notifies the examiner accordingly (S5099).

Figure 34:
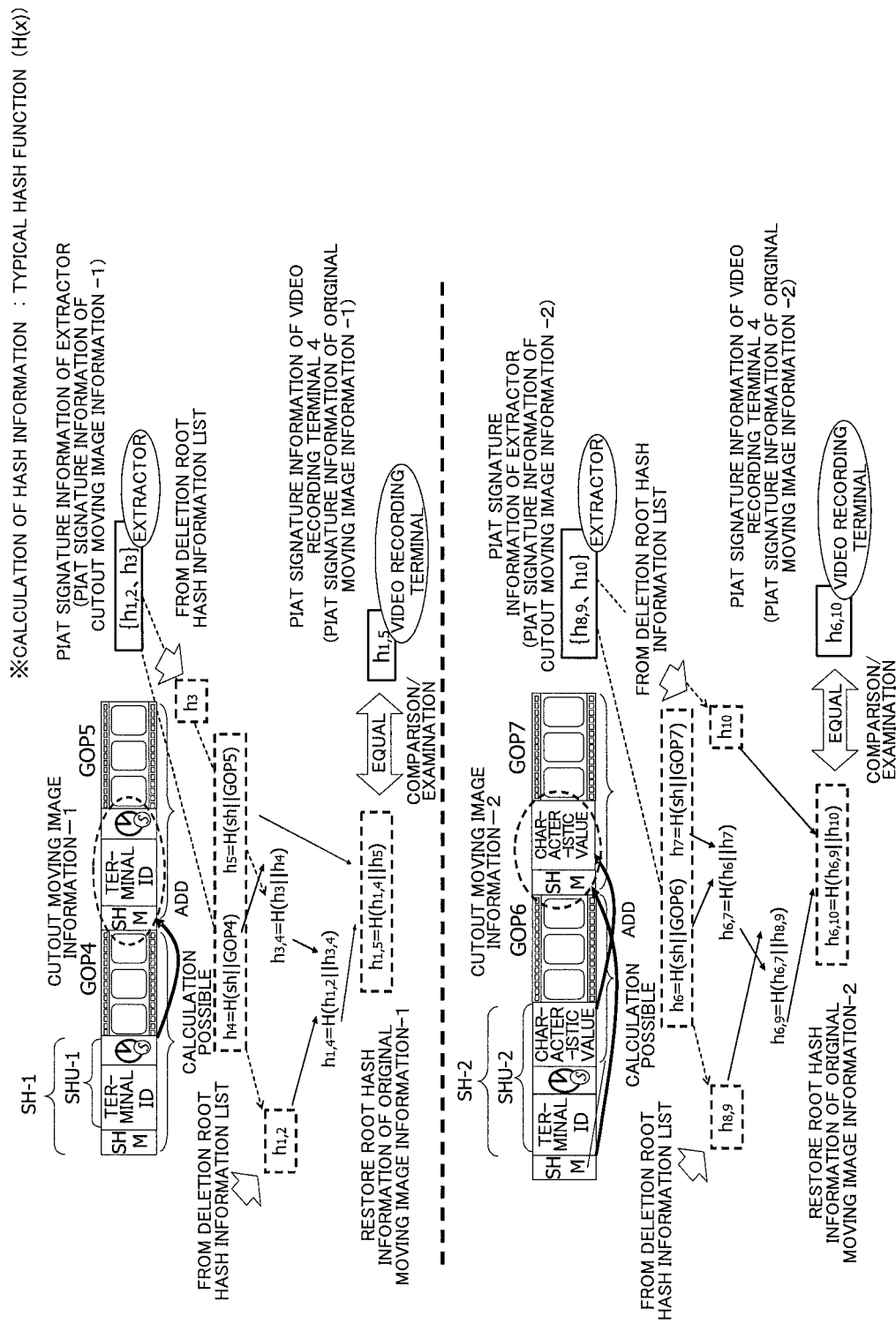
FIG. 34 is a diagram illustrating a signature examination method of cutout moving image information that stretches across a plurality of pieces of original moving image information according to an embodiment of the present invention.

When the signature examination server 7 succeeds in examining the electronic signature (S5005: YES), the signature examination server 7 then examines the PIAT signature information for the cutout moving image information (S5006). FIG. 34 illustrates the examination methods of the PIAT signature information for one hour or more worth of cutout moving image information. The examination methods are each the same as those illustrated in FIGS. 32 and 33 and thus will not be described here. However, if it is confirmed as a result of both examination processes that the FIAT signature information is part of the original moving image information and has not been altered, the signature examination server 7 succeeds in examining the PIAT signature information.

When the signature examination server 7 fails to examine the PIAT signature information (S5007: NO), the signature examination server 7 judges that some kind of alteration has occurred and notifies the examiner accordingly (S5099). When the signature examination server 7 succeeds in examining the PIAT signature information (S5007: YES), the signature examination server 7 then moves to a process of examining the date-and-time information of the cutout moving image information in response to the result of the examination (S5008).

Figure 35:
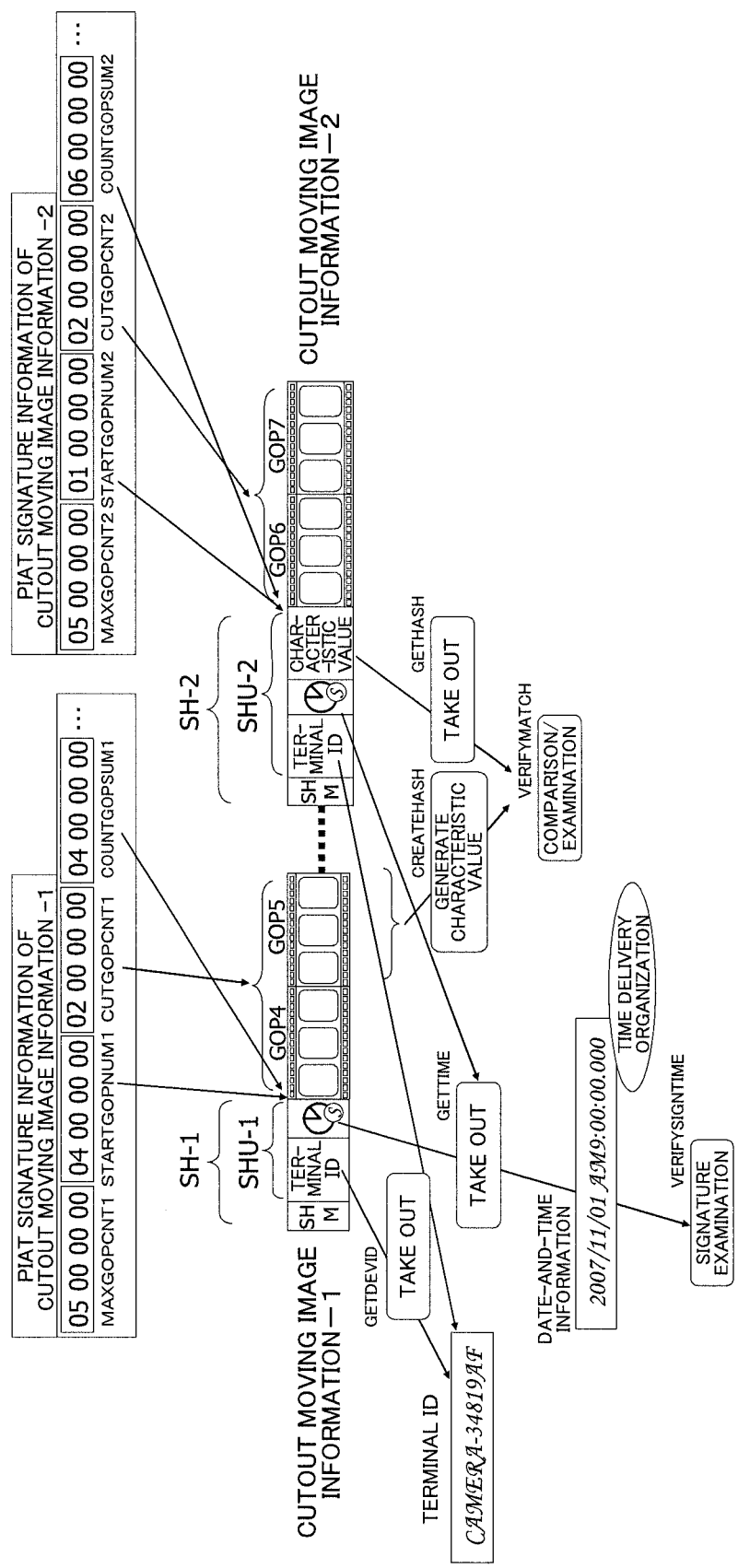
FIG. 35 is a diagram illustrating a date-and-time examination method of cutout moving image information according to an embodiment of the present invention.

The following uses an example of the examination method of the date-and-time information for one hour or more worth of cutout moving image information. FIG. 35 illustrates the examination method thereof. First, the signature examination server 7 takes out the date-and-time information (which is hereinafter assumed to be 2007/11/01AM9:00:00.000 for explanation) stored in the SHU-1 and SHU-2, with the electronic signature of the time delivery organization being attached to the date-and-time information (GETTIME) and examines the electronic signature of the time delivery organization (VERIFYSIGNTIME). Then, in order to confirm that the cutout moving image information-1 is followed by the cutout moving image information-2, the signature examination server 7 generates a characteristic value from the last GOP (GOP5) of the cutout moving image information-1 (CREATEHASH). Subsequently, the signature examination server 7 takes out a characteristic value stored in the SHU-2 of the cutout moving image information-2 (CETHASH) and compares and examines the characteristic value and the characteristic value generated by CREATEHASH (VERIFYMATCH). When the characteristic values are equal, it is possible to confirm that the cutout moving image information-1 is followed by the cutout moving image information-2. Moreover, the signature examination server 7 takes out the terminal IDs (which are hereinafter assumed to be CAMERA-34819AF for explanation) stored in the SHU-1 and SHU-2 (GETDEVID) and confirms that the terminal IDs are equal. Therefore, it is possible to confirm that the consecutive moving image data items are disclosed at the same video recording terminal 4 and that the moving image data items are part of the original moving image information and have not been altered.

Thanks to the examination of VERIFYSIGNTIME, it is proven that the date-and-time information has been issued by the time delivery organization and is valid. Therefore, according to the present embodiment, in order to prove the actual time of the cutout moving image information, what needs to be done first is to verify the date-and-time information of the top GOP (GOP4) of the cutout moving image information-1. The date-and-time information taken out by GETTIME is the date-and-time information indicating the time when the video recording of the original moving image information-1 has started. Thus, by using information of MAXGOPCNT1, STARTGOPNUM1, CUTGOPCNT1 and COUNTGOPSUM1 stored in the cutout moving image information-1, the date and time of GOP4 are identified. According to the present embodiment, the cutout moving image information-1 means that from the original moving image information-1 that is formed by including a collection of five pieces (MAXGOPCNT1) of partial information (GOP) and from the fourth one (STARTGOPNUM1), two (GUTGOPCNT1) GOPs are cut out. As described above, according to the premise of the present embodiment, the frame rate and the number of pictures included in each GOP of each piece of original moving image information are fixed; it is easy to identify a playing time in the original moving image information. Therefore, based on such kinds of information, it is also possible to identify the date-and-time information of the top GOP (GOP4) of the cutout moving image information-1.

Figure 36:
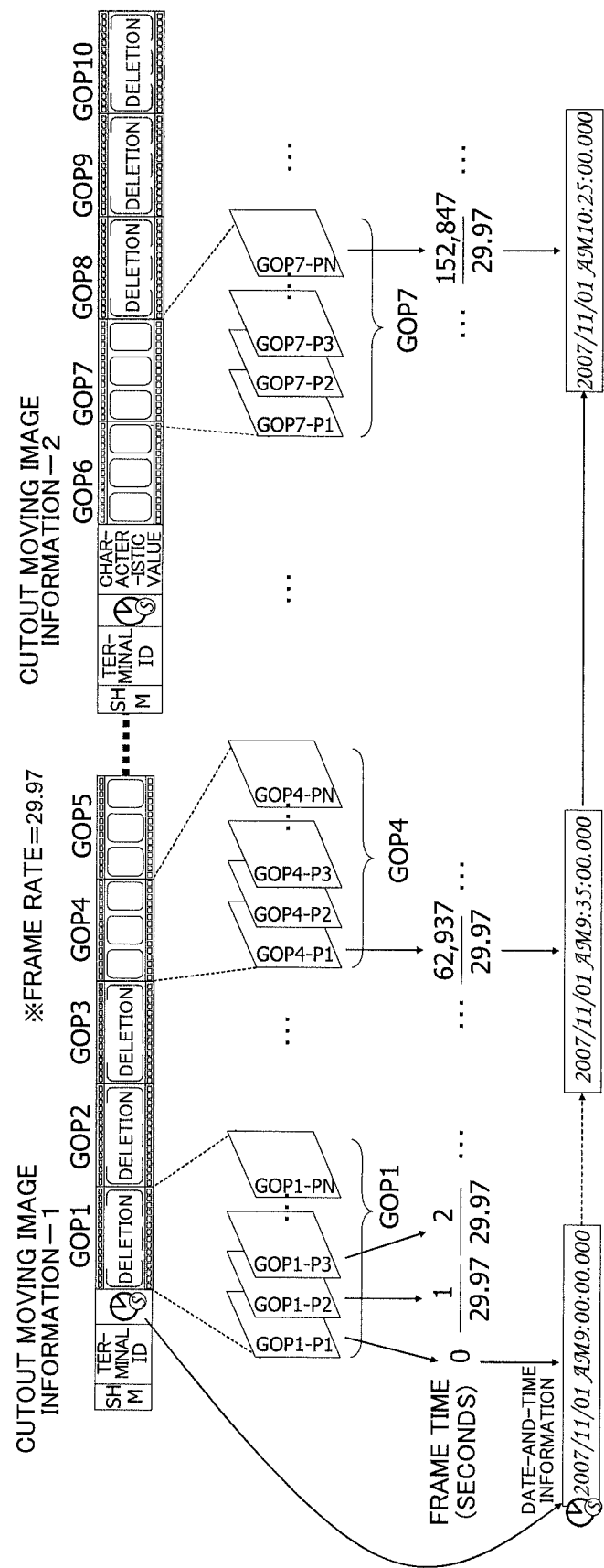
FIG. 36 is a diagram illustrating the structure of a picture of cutout moving image information and a calculation method of a frame time of each picture according to an embodiment of the present invention.

FIG. 36 illustrates the structure of a picture recorded in each GOP and a calculation method of a frame time of each picture in the cutout moving image information-1 and cutout moving image information-2. If the frame rate is 29.97, the frame times are identified through calculation: the frame time of the first picture (GOP1-P1) in the top GOP (GOP1) is at zero second, the frame time of the second picture (GOP1-P2) at 1/29.97 seconds, the frame time of the third picture (GOP1-P3) at 2/29.97 seconds, and so forth. The frame time of the nth picture is calculated by the following calculating formula: $(N-1)/29.97$ seconds. Thus, based on the number of pictures included in each GOP and the value of the frame rate, it is possible to identify the frame time of the top picture of a given GOP. In that manner, the frame time of the top picture (GOP4-P1) of the top GOP (GOP4) of the cutout moving image information-1 is identified, for example, as 62,937/29.97 seconds.

There may be the following method: the total sum of pictures existing from the top picture of the top GOP (GOP1) to the top picture of the GOP at the cutout start position, i.e. what number picture the top picture of the GOP at the cutout start position is from the top picture of the top GOP (GOP1), is calculated in advance and kept as a list. FIG. 37 illustrates a list of the total sum of pictures that exist right up to the preceding one in each GOP position. For example, it may be confirmed from the present table that when the cutout start position is GOP4, the last picture of the preceding GOP3 is the $62,936^{th}$ picture from the top picture of the top GOP (GOP1), i.e. the total sum of the pictures is 62,936. As a result, it may be confirmed that the top picture (GOP4-P1) of the top GOP (GOP4) of the cutout moving image information-1 is the $62,937^{th}$ picture, with one picture added to the information.

Moreover, the actual time of the first picture (GOP1-P1) of the top GOP (GOP1) is equal to the date-and-time information (2007/11/01AM9:00:00.000) taken out by GETTIME. The first actual time of the cutout moving image information-1 turns out to be the time (2007/11/01AM9:35:00.000), which is obtained by adding 62,937/29.97 seconds to the above date-and-time information. The last frame time of the last GOP (GOP7) of the cutout moving image information-2 is similarly calculated: the last actual time of the cutout moving image information-2 turns out to be the time (2007/11/01AM10:25:00.000), which is obtained by adding 152,847/29.97 seconds.

Accordingly, the date-and-time range of the cutout moving image information extends from 2007/11/01AM9:35:00.000 to 2007/11/01AM10:25:00.000; it may be confirmed that about 50 minutes worth of information is cut out.

Thanks to the examination described above, it may be proven to a third party that the cutout moving image information is part of the original moving image information, has not been altered, is recorded by the video recording terminal 4 having a terminal ID of CAMERA-34819AF and is cut out with the date-and-time range of 2007/11/01AM9:35:00.000 to 2007/11/01AM10:25:00.000.

Subsequently, the signature examination server 7 transmits the examination result of the PIAT signature information of the cutout moving image information to the examiner terminal 8 (S5009). After the examiner terminal 8 receives the examination result of the PIAT signature information of the cutout moving image information (S5010), the examination result of the PIAT signature information of the cutout moving image information is displayed on a display device the examiner terminal 8 is equipped with (S5011).

Figure 38:
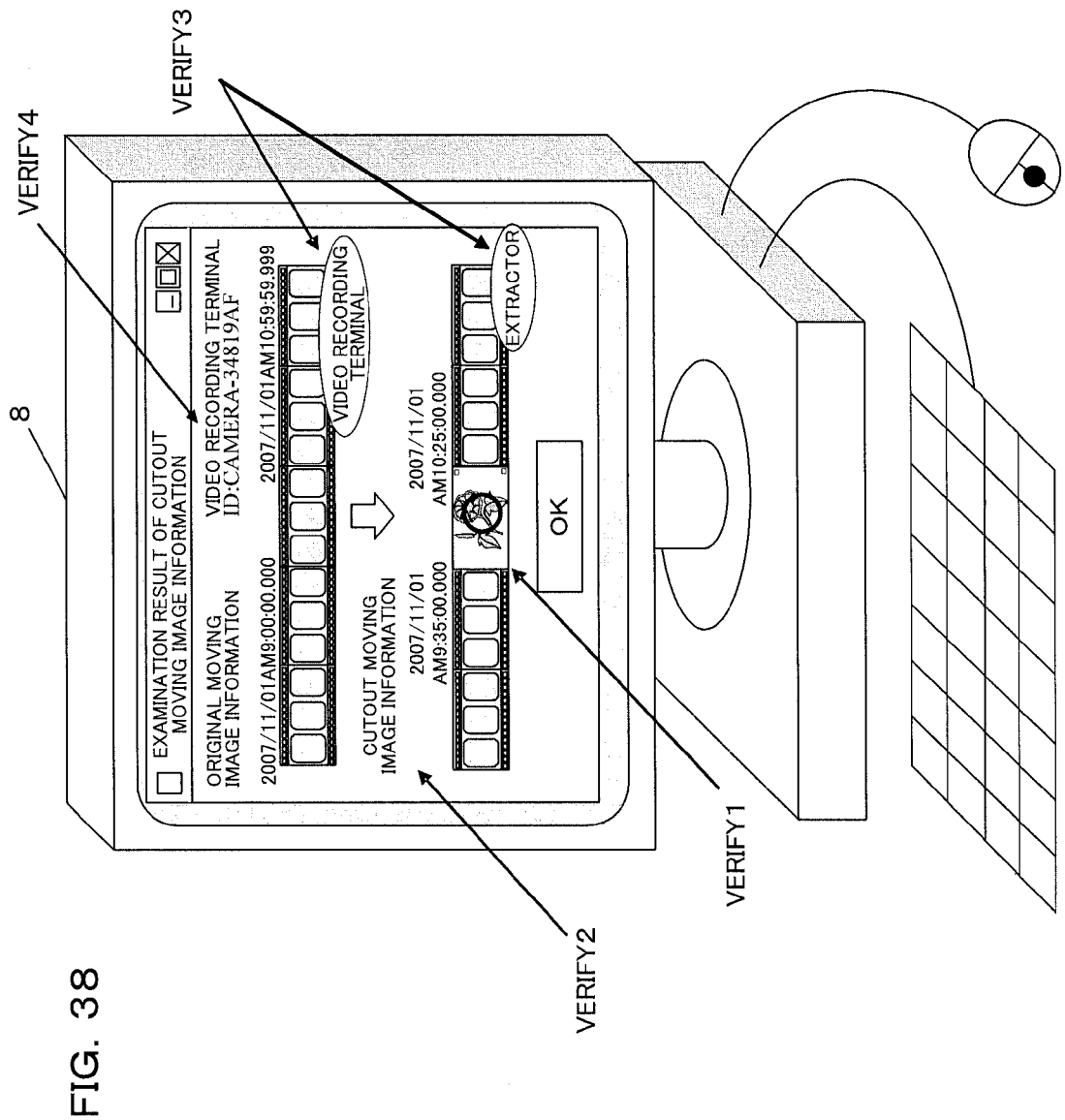
FIG. 38 is a diagram illustrating a signature examination result of cutout moving image information according to an embodiment of the present invention.

FIG. 38 illustrates an example of the signature examination result displayed on the display device the examiner terminal 8 is equipped with. By making reference to the examination result, the examiner may verify the originality of the cutout moving image information (VERIFY1 and VERIFY 2) because what is displayed allows the examiner to confirm that the information is part of the original moving image information as well as making clear the cutout range indicating which portion of the original moving image information is cut out and the actual time, the fact that the portion has not been altered, and which video recording terminal 4 is used to record. Moreover, thanks to the process of confirming the electronic signatures of the video recording terminal 4 and examiner, it is possible to confirm that the original moving image information is generated by the video recording terminal 4 and that the cutout moving image information is generated by the extractor (VERIFY3). Furthermore, it is possible to confirm the terminal ID indicating which video recording terminal 4 is used for recording (VERIFY4).

It is also possible to carry out examination for original moving image information. If the original moving image information is selected by VERIFYTYPE of FIG. 31, in a similar way to the signature examination of the cutout moving image information, it is possible to select the original moving image information and the PIAT signature information of the video recording terminal 4 (it is unnecessary to select the PIAT signature information of the extractor); by pushing the signature examination button (VERIFYRUN), the signature examination process for the selected original moving image information starts.

Incidentally, according to the present embodiment, in order to reduce the amount of data of the PIAT signature information, such inventions as the one disclosed in the above Japanese Patent Application No. 2007-12048 are used, in which case the hash information is managed by binary tree. However, if there is extra storage space on the document management DB of each server, instead of the method in which the hash information is managed by binary tree, such methods as the one disclosed in WO2006/008847 may be used without change to generate and record the hash information for each GOP included in the original moving image information.

According to the present embodiment, what has been described is the method in which the date-and-time information is stored and recorded in the SH of the first original moving image information. However, the date-and-time information may be stored in anything other than the SH of the first original moving image information (The date-and-time information may be stored after the last GOP, for example). According to the present embodiment in which the date-and-time information is stored in the SH of the first original moving image information at the start of the recording, the effect is that it is possible to examine the originality of those actually recorded and to guarantee the date and time even if the video recording terminal 4 is unable to continue recording due to some malfunction or the like immediately after the start of the recording.

Figure 39:
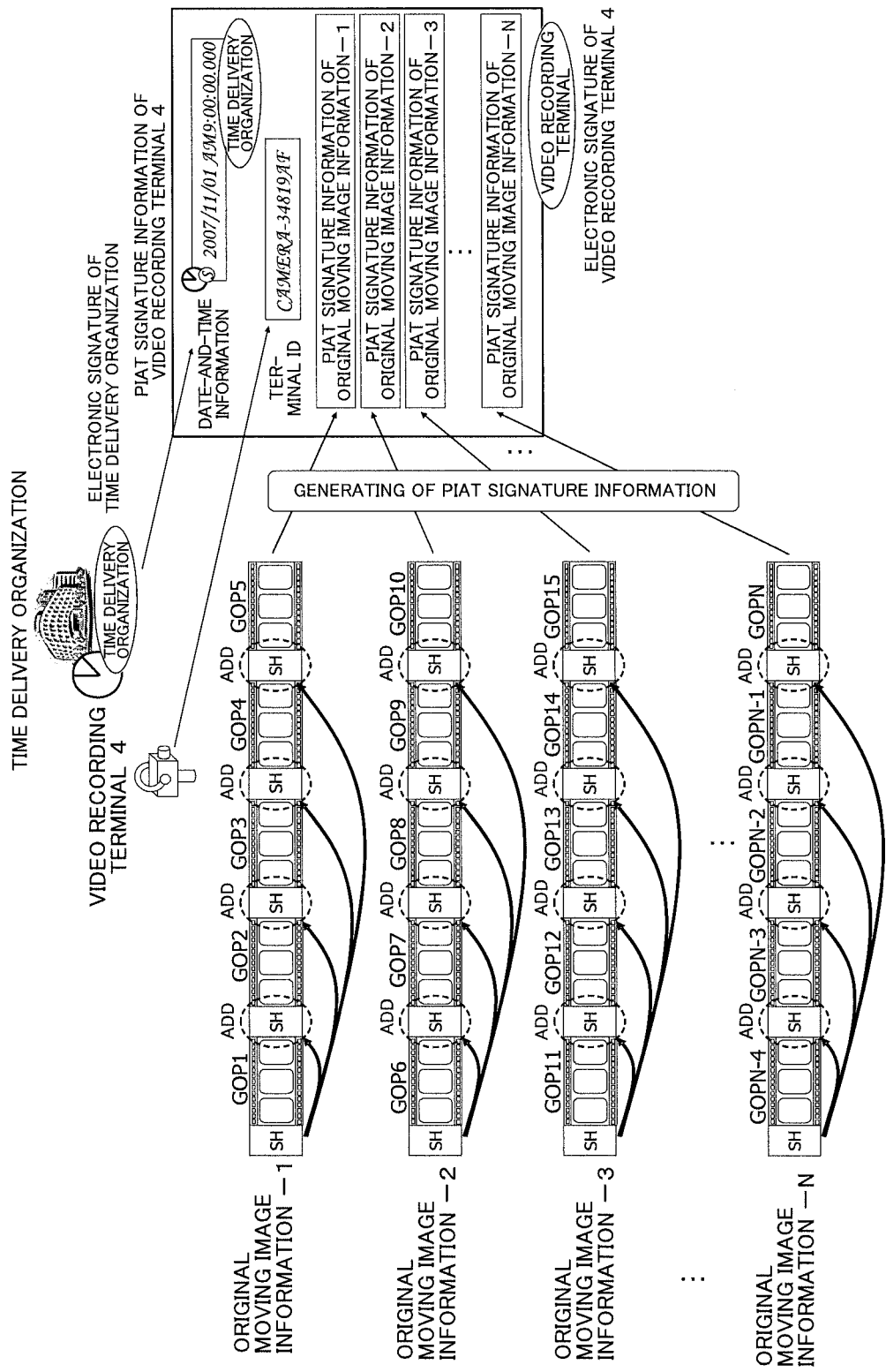
FIG. 39 is a diagram illustrating a signature generation method of original moving image information according to another embodiment of the present invention.

There may be another method as illustrated in FIG. 39, according to a second embodiment of the present invention. One of the objects of the present invention is to prevent wrongdoing such as extraction or addition from occurring by focusing on consecutive pieces of original moving image information. When such methods as the one disclosed in the above Patent Document 1 are used, it is possible to guarantee the originality, continuity, and time-series quality of all pieces of original moving image information divided by a given unit.

More specifically, as illustrated in FIG. 39, first the PIAT signature information of each piece of original moving image information is generated; the generated pieces of PIAT signature information are then put together in chronological order in such a way that it is possible to recognize the order that the pieces of PIAT signature information are generated. At this time, as described above, the PIAT signature information is recorded on a one hour basis. Therefore, there is a possibility that alterations or the like may occur in the meantime. Accordingly, the PIAT signature information, which is generated on a one hour basis, is accumulated in a way that makes it impossible to alter the PIAT signature information (such methods as storing the PIAT signature information in a tamper-proof area, for example). After the generating of the PIAT signature information is completed, the electronic signature-attached date-and-time information acquired from the time delivery organization and the terminal ID of the video recording terminal 4 are added; finally, for the entire information described above, the recording and management process is performed with the following information being used as the examination information: the PIAT signature information of the video recording terminal 4 to which the electronic signature of the video recording terminal 4 is attached. Even in the above embodiment, the date-and-time information is acquired just one time; it is possible to guarantee the originality, continuity, and time-series quality of all pieces of original moving image information divided by a given unit.

According to the present invention, even if a portion of the original moving image information is cut out for privacy protection and the like, it is possible to avoid the situation in which the cutout moving image information may not play and to examine the originality of the cutout moving image information including the detecting of the cutout point (position) and the cutout actual time. The examiner is identified from the electronic signature for the PIAT signature information. Therefore, even if the extractor alters the cutout moving image information or adds something to the cutout moving image information, it is possible to trace the alterations or additions.

Incidentally, by providing a program that causes a computer to execute each of the operations represented by the flowcharts and steps illustrated in the above embodiments with reference to the drawings, it is possible to offer a stream data management program of the present invention. The program may be executed by a computer after the program is recorded in a computer-readable medium. Computers include a host device such as personal computer, a controller of a testing device, and a controller such as MPU or CPU of a storage device. Computer-readable media include a portable storage medium such as CD-ROM, flexible disk, DVD disc, magnetic optical disc and IC card; a database for storing computer programs; another computer and a database thereof; and a transmission medium on a line.

According to the present invention, by acquiring the date-and-time information guaranteed by a third party just one time, it is possible to verify the originality and the actual time at low cost for the cutting out of a portion of the stream data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has (have) been described in detail, it should be understood that the various changes, substitutions, and alterations could be made hereto without departing from the spirit and scope of the invention.

What is claimed is:

1. A stream data management method comprising:
generating an original stream data item including a plurality of original data items arranged in chronological order, that each include a plurality of pieces of partial information arranged in chronological order and are divided by a predetermined time unit by using a stream data generation terminal, storing in a sequence header of any one of the original data items a terminal ID indicating the stream data generation terminal and date-and-time information that is guaranteed by a third party at a time when the original stream data item is generated, generating a characteristic value using the last piece of partial information in chronological order of the preceding original data item, and storing the generated characteristic value in a sequence header of the next original data item, the characteristic value uniquely showing the partial information;

generating signature-related information of the original data item by adding the contents of the sequence header including the terminal ID and the date-and-time information for the original data item having the sequence header in which the terminal ID and the date-and-time information are stored, while generating signature-related information of the original data item by adding the contents of the sequence header including the characteristic value of the last piece of partial information of the preceding original data item for the other original data items;

cutting out a portion of the original stream data item, producing a cutout data item by adding a sequence header including the terminal ID, the date-and-time information and the characteristic value of the last piece of partial information of the preceding original data item to each of the original data items including the cutout portion, and generating a cutout stream data item consisting of the cutout data items;

generating the signature-related information of the cutout data item that includes the terminal ID and the date-and-time information when the cutout data item is in the original data item having the sequence header in which the terminal ID and the date-and-time information are stored, while generating the signature-related information of the cutout data item that includes the characteristic value of the last piece of partial information of the preceding original data item in other cases; and verifying the originality and actual time of the cutout stream data item on the basis of the cutout stream data item, the signature-related information of each cutout data item in the cutout stream data item and the signature-related information of each original data item in the original stream data item.

2. The method according to claim 1, wherein the terminal ID and the date-and-time information are stored in the sequence header of the top original data item.

3. The method according to claim 2, wherein the characteristic value of the last piece of partial information of the preceding original data item is stored in the sequence headers of the second and subsequent original data items.

4. The method according to claim 1, wherein hash information is generated for each piece of partial information by adding the contents of the most recent sequence header to a piece of partial information to which the sequence header is not added, an electronic signature of the stream data generation terminal is generated for one piece of root hash information obtained from the hash information, and the root hash information and the electronic signature of the stream data generation terminal are regarded collectively as the signature-related information of the original data item.

5. The method according to claim 1, wherein when the cutting out from the original stream data item is within a predetermined time unit and in the first original data item, the cutout data item is generated by adding the sequence header including the terminal ID and the date-and-time information.

6. The method according to claim 1, wherein when the cutting out from the original stream data item is within a predetermined time unit and in the second to nth original data items, the cutout data item is generated by adding the sequence header including the terminal ID, the date-and-time information and the characteristic value of the last piece of partial information of the preceding original data item.

7. The method according to claim 1, wherein when the cutting out from the original stream data item is performed for a plurality of original data items in a way that goes beyond a predetermined time unit, the cutout data items are generated by adding the sequence header including the terminal ID, the date-and-time information and the characteristic value of the last piece of partial information of the preceding original data item to a plurality of the original data items.

8. The method according to claim 4, wherein deletion root hash information is generated by adding the contents of the most recent sequence header to a piece of partial information to which the sequence header is not added for a piece of partial information that is deleted by the cutting out from the original stream data item, an electronic signature of an extractor is generated for the deletion root hash information, and the deletion root hash information, the electronic signature of the extractor and sum information indicating what number piece of partial information the cutout data item is from the start of the original stream data item are regarded collectively as the signature-related information of the cutout data item.

9. The method according to claim 8, wherein after the electronic signatures included in the signature-related information of the original data item and the signature-related information of the cutout data item are examined, the originality of the cutout stream data item is examined and the date-and-time information of the cutout stream data item is examined.

10. The method according to claim 9, wherein the hash information is generated for each piece of partial information by adding the contents of the most recent sequence header to a piece of partial information to which the sequence header is not added for each cutout data item in the cutout stream data item, the root hash information of the corresponding original data item is restored from the hash information and the deletion root hash information included in the signature-related information of the cutout data item, and the originality of the cutout stream data item is examined by comparing the restored root hash information of the original data item and the root hash information included in the signature-related information of the original data item.

11. The method according to claim 9, wherein after the electronic signature of the third party attached to the date-and-time information included in the sequence header of each cutout data item in the cutout stream data item is examined, the actual time of the cutout stream data item is verified based on the date-and-time information and the sum information included in the signature-related information of the cutout data item.

12. The method according to claim 11, wherein a frame time of the cutout data item is calculated based on a preset frame rate and the sum information included in the signature-related information of the cutout data item, and the actual time of the cutout stream data item is calculated by adding the frame time and the date-and-time information.

13. The method according to claim 11, wherein a characteristic value is generated from the last piece of partial information of each cutout data item when the cutout stream data item includes a plurality of cutout data items that appear one after another over time, and the continuity of a plurality of the cutout data items is examined by comparing the characteristic values with the characteristic values included in the sequence headers of the next cutout data items.

14. The method according to claim 11, wherein when the cutout stream data item includes a plurality of cutout data items that appear one after another over time, the identity of the stream data generation terminal is examined by comparing the terminal IDs included in the sequence headers of the cutout data items.

15. The method according to claim 1, wherein the third party is a time delivery organization server that issues date-and-time information and, after a predetermined time unit has passed since the issuance of the date-and-time information, the time delivery organization server automatically notifies accordingly.

16. The method according to claim 1, wherein the signature-related information is PIAT signature information.

17. A non-transitory computer-readable storage device having recorded thereon a stream data management program that causes a computer to execute a process comprising:
generating an original stream data item including a plurality of original data items arranged in chronological order, that each include a plurality of pieces of partial information arranged in chronological order and are divided by a predetermined time unit by using a stream data generation terminal, storing in a sequence header of any one of the original data items a terminal ID indicating the stream data generation terminal and date-and-time information that is guaranteed by a third party at a time when the original stream data item is generated, generating a characteristic value using the last piece of partial information in chronological order of the preceding original data item and storing the generated characteristic value in a sequence header of the next original data item, the characteristic value uniquely showing the partial information;
generating signature-related information of the original data item by adding the contents of the sequence header including the terminal ID and the date-and-time information for the original data item having the sequence header in which the terminal ID and the date-and-time information are stored, while generating signature-related information of the original data item by adding the contents of the sequence header including the characteristic value of the last piece of partial information of the preceding original data item for the other original data items;
cutting out a portion of the original stream data item, producing a cutout data item by adding a sequence header including the terminal ID, the date-and-time information and the characteristic value of the last piece of partial information of the preceding original data item to each of the original data items including the cutout portion, and generating a cutout stream data item consisting of the cutout data items;
generating the signature-related information of the cutout data item that includes the terminal ID and the date-and-time information when the cutout data item is in the original data item having the sequence header in which the terminal ID and the date-and-time information are stored, while generating the signature-related information of the cutout data item that includes the characteristic value of the last piece of partial information of the preceding original data item in other cases; and
verifying the originality and actual time of the cutout stream data item on the basis of the cutout stream data item, the signature-related information of each cutout data item in the cutout stream data item and the signature-related information of each original data item in the original stream data item.

18. A stream data management system comprising:
an original stream data generation section that generates an original stream data item including a plurality of original data items arranged in chronological order, that each include a plurality of pieces of partial information arranged in chronological order and are divided by a predetermined time unit by using a stream data generation terminal, stores in a sequence header of any one of the original data items a terminal ID indicating the stream data generation terminal and date-and-time information that is guaranteed by a third party at a time when the original stream data item is generated, generates a characteristic value using the last piece of partial information in chronological order of the preceding original data item and stores the generated characteristic value in a sequence header of the next original data item, the characteristic value uniquely showing the partial information;
an original signature-related information generation section that generates signature-related information of the original data item by adding the contents of the sequence header including the terminal ID and the date-and-time information for the original data item having the sequence header in which the terminal ID and the date-and-time information are stored, while generating signature-related information of the original data item by adding the contents of the sequence header including the characteristic value of the last piece of partial information of the preceding original data item for the other original data items;
a cutout stream data generation section that cuts out a portion of the original stream data item, producing a cutout data item by adding a sequence header including the terminal ID, the date-and-time information and the characteristic value of the last piece of partial information of the preceding original data item to each of the original data items including the cutout portion, and generates a cutout stream data item consisting of the cutout data items;
a cutout signature-related information generation section generates the signature-related information of the cutout data item that includes the terminal ID and the date-and-time information when the cutout data item is in the original data item having the sequence header in which the terminal ID and the date-and-time information are stored, while generating the signature-related information of the cutout data item that includes the characteristic value of the last piece of partial information of the preceding original data item in other cases; and
a verification section that verifies the originality and actual time of the cutout stream data item on the basis of the cutout stream data item, the signature-related information of each cutout data item in the cutout stream data item and the signature-related information of each original data item in the original stream data item.

19. A non-transitory computer-readable storage device having recorded thereon a stream data management program that causes a computer to execute a process comprising:
generating an original stream data item including a plurality of original data items arranged in chronological order, that each include a plurality of pieces of partial information arranged in chronological order and are divided by a predetermined time unit by using a stream data generation terminal;

generating a characteristic value using a last piece of partial information in chronological order of a preceding original data item, the characteristic value uniquely showing the partial information;

generating a piece of signature-related information with respect to an original data item to which the generated characteristic value is added;

putting together the pieces of signature-related information of the original data items in chronological order; and generating signature-related information for the put-together pieces of signature-related information of the original data items to which added are a terminal ID indicating the stream data generation terminal and date-and-time information that is guaranteed by a third party at a time when the original stream data item is generated.

20. A stream data management method comprising:

generating an original stream data item including a plurality of original data items arranged in chronological order, that each include a plurality of pieces of partial information arranged in chronological order and are divided by a predetermined time unit by using a stream data generation terminal;

generating a characteristic value using a last piece of partial information in chronological order of a preceding original data item, the characteristic value uniquely showing the partial information;

generating a piece of signature-related information with respect to an original data item to which the generated characteristic value is added;

putting together the pieces of signature-related information of the original data items in chronological order; and generating signature-related information for the put-together pieces of signature-related information of the original data items to which added are a terminal ID indicating the stream data generation terminal and date-and-time information that is guaranteed by a third party at a time when the original stream data item is generated.

* * * * *